United States Patent
Su

(10) Patent No.: US 11,245,470 B2
(45) Date of Patent: Feb. 8, 2022

(54) METHOD, DEVICE, AND SYSTEM FOR TRANSMITTING DATA

(71) Applicant: HUAWEI TECHNOLOGIES CO., LTD., Guangdong (CN)

(72) Inventor: Wei Su, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/874,996

(22) Filed: May 15, 2020

(65) Prior Publication Data
US 2020/0280371 A1 Sep. 3, 2020

Related U.S. Application Data

(63) Continuation of application No. PCT/CN2018/091853, filed on Jun. 19, 2018.

(30) Foreign Application Priority Data

Nov. 16, 2017 (CN) .......................... 201711140714.2

(51) Int. Cl.
*H04B 10/40* (2013.01)
*H04B 10/27* (2013.01)
(Continued)

(52) U.S. Cl.
CPC ......... *H04B 10/27* (2013.01); *H04Q 11/0003* (2013.01); *H04Q 11/0062* (2013.01);
(Continued)

(58) Field of Classification Search
CPC .... H04B 10/27; H04B 10/40; H04Q 11/0003; H04Q 11/0062; H04Q 2011/0088;
(Continued)

(56) References Cited

U.S. PATENT DOCUMENTS 9,300,429 B2 * 3/2016 Abbas ................ H04Q 11/0066
10,382,167 B2 * 8/2019 Gareau ................ H04L 49/351
(Continued)

FOREIGN PATENT DOCUMENTS

CN 106330630 A 1/2017
CN 106411454 A 2/2017
(Continued)

OTHER PUBLICATIONS

Anonymous:"Flex Ethernet Implementation Agreement",OIF, Optical Internetworking Forum, Jun. 21, 2017 (Jun. 21, 2017), pp. 1-35, XP055459219, total 35 pages.
(Continued)

*Primary Examiner* — Dibson J Sanchez

(57) ABSTRACT

At least a method and a device for transmitting data are disclosed. The method includes obtaining n FlexE signal streams, where a transmission rate of each FlexE signal stream is a first rate, distributing an $i^{th}$ FlexE signal stream into m signal sub-streams, where each of the m signal sub-streams carries a first identifier, which indicate that the signal sub-stream carrying the first identifier belongs to the $i^{th}$ FlexE signal stream, inserting a preset quantity of padding code blocks into each of the m signal sub-streams, to obtain m padded signal sub-streams, so that transmission rate of each of the m padded signal sub-streams is equal to that of a first optical module, where the rate of the first optical module is greater than the first rate/m, and less than the first rate, and sending the m padded signal sub-streams by using m first optical modules.

16 Claims, 26 Drawing Sheets

(51) Int. Cl.
*H04Q 11/00* (2006.01)
*H04L 1/00* (2006.01)
*H04L 12/721* (2013.01)

(52) U.S. Cl.
CPC ............ *H04B 10/40* (2013.01); *H04L 1/0008* (2013.01); *H04L 45/66* (2013.01); *H04Q 2011/0088* (2013.01)

(58) Field of Classification Search
CPC ............ H04J 2203/0085; H04J 3/1658; H04L 1/0008; H04L 45/66
USPC .................. 398/43–103, 135–139, 182–214
See application file for complete search history.

(56) References Cited

U.S. PATENT DOCUMENTS

| | | | | |
|---|---|---|---|---|
| 2004/0062277 | A1* | 4/2004 | Flavin | H04L 12/4633 370/474 |
| 2009/0169217 | A1* | 7/2009 | Meagher | H04J 3/047 398/140 |
| 2014/0270776 | A1* | 9/2014 | Jinno | H04J 14/0204 398/69 |
| 2015/0055664 | A1* | 2/2015 | Kanonakis | H04Q 11/00 370/535 |
| 2015/0288484 | A1* | 10/2015 | Nie | H04L 1/00 714/776 |
| 2016/0241462 | A1* | 8/2016 | Wang | H04L 1/0067 |
| 2017/0005742 | A1 | 1/2017 | Gareau et al. | |
| 2017/0005949 | A1* | 1/2017 | Gareau | H04L 12/413 |
| 2017/0006360 | A1 | 1/2017 | Gareau | |
| 2017/0111116 | A1* | 4/2017 | Ohara | H04B 10/40 |
| 2017/0230338 | A1 | 8/2017 | Loprieno et al. | |
| 2017/0310538 | A1 | 10/2017 | Cai et al. | |
| 2017/0324657 | A1* | 11/2017 | Zhong | H04L 1/00 |
| 2018/0123978 | A1 | 5/2018 | Zhong et al. | |
| 2018/0159785 | A1 | 6/2018 | Wu et al. | |
| 2018/0183538 | A1 | 6/2018 | Chen et al. | |
| 2019/0356501 | A1* | 11/2019 | Liu | H04L 47/10 |
| 2020/0396097 | A1* | 12/2020 | Deng | H04L 69/22 |

FOREIGN PATENT DOCUMENTS

| | | |
|---|---|---|
| CN | 106612203 A | 5/2017 |
| CN | 106788855 A | 5/2017 |
| EP | 3113502 A1 | 1/2017 |
| WO | 2017070851 A1 | 5/2017 |

OTHER PUBLICATIONS

Supplementary European Search Report in European Application No. EP 18 878 383 dated Nov. 30, 2020, 10 pages.

* cited by examiner

| Bit | 0 1 | 2 ... 9 | 10 ... 13 | 14 ... 33 | 34 ... 37 | 38 ... 65 |
|---|---|---|---|---|---|---|
| | 10 | 0x4b | 0x3 | 0xfffff | 0xa | 0x0000000 |

FIG. 9A

| Bit | 0 1 | 2 ... 9 | 10 11 | 12 13 | 14 ... 33 | 34 ... 37 | 38 ... 65 |
|---|---|---|---|---|---|---|---|
| | 10 | 0x4b | 0x1 or 0x2 | 0x3 | 0xfffff | 0xa | 0x0000000 |

METHOD, DEVICE, AND SYSTEM FOR TRANSMITTING DATA

CROSS-REFERENCE TO RELATED APPLICATIONS

This application is a continuation of International Patent Application No. PCT/CN2018/091853, filed on Jun. 19, 2018, which claims priority to Chinese Patent Application No. 201711140714.2, filed on Nov. 16, 2017. The disclosures of each of these applications are hereby incorporated by reference in their entireties.

TECHNICAL FIELD

This application relates to the field of communications technologies, and in particular, to a method, a device, and a system for transmitting data.

BACKGROUND

A flexible Ethernet implementation protocol released by the optical internetworking forum (OIF) defines a flexible Ethernet (FlexE) shim layer at an Ethernet physical layer (PHY). The FlexE shim layer can support hybrid transport of a plurality of Ethernet services with different rates over a bundled physical channel. The Ethernet physical layer may also be referred to as an optical module. A transmission rate that can be supported by an optical module used currently is 100 Gbit/s, where the optical module with a rate of 100 Gbit/s may also be referred to as a 100 gigabit Ethernet (GE) optical module. An n*100 G FlexE shim layer schedules and distributes, based on a time division multiplexing distribution mechanism, data of a plurality of FlexE client interfaces with different transmission rates in a manner of a calendar slot (CS), into n FlexE signal streams including a FlexE instance frame with a transmission rate of 100 Gbit/s. Then, the n FlexE signal streams are respectively transmitted to n 100 GE optical modules, and a FlexE signal transmission rate supported by the FlexE shim layer is 100 Gbit/s.

Currently, IEEE 802.3 is gradually implementing definitions of 25 GE and 50 GE optical modules. However, the FlexE shim layer that supports the rate of n*100 Gbit/s cannot be compatible with an optical module with a transmission rate that is not 100 Gbit/s.

SUMMARY

This application provides a method, a device, and a system for transmitting data, to resolve a problem in the prior art that a FlexE shim layer cannot be compatible with an optical module with a transmission rate that is not 100 Gbit/s.

According to a first aspect, an embodiment of this application provides a method for transmitting data in a FlexE. The method may be implemented by a transmission device, specifically may be implemented by a chip, a module, or the like in the transmission device. The chip or the module can implement functions of a FlexE shim layer. The method includes: obtaining n FlexE signal streams, where a transmission rate of each FlexE signal stream is a first rate; distributing an $i^{th}$ FlexE signal stream into m signal sub-streams, where each signal sub-stream of the m signal sub-streams carries a first identifier, the first identifier is used to indicate that the signal sub-stream carrying the first identifier belongs to the $i^{th}$ FlexE signal stream, i is a positive integer less than or equal to n, and m is an integer greater than or equal to 2; inserting a preset quantity of padding code blocks into each signal sub-stream of the m signal sub-streams, to obtain m padded signal sub-streams, so that a transmission rate of each of the m padded signal sub-streams is equal to a rate of a first optical module, where the rate of the first optical module is greater than the first rate/m, and the rate of the first optical module is less than the first rate; and sending the m padded signal sub-streams by using m first optical modules. When a transmission rate supported by the FlexE shim layer for processing the FlexE signal stream is greater than the transmission rate of the optical module, the FlexE signal stream is decomposed by using the foregoing implementation, thereby reducing the transmission rate, so that the reduced transmission rate is equal to the transmission rate of the optical module. Therefore, compatibility between the FlexE shim layer and the optical module is ensured.

In a possible implementation, after the obtaining n FlexE signal streams, the method may further include: sending a $j^{th}$ FlexE signal stream by using a second optical module, where a rate of the second optical module is equal to the first rate, j is a positive integer less than or equal to n, and j is not equal to i. By using the foregoing implementation, the transmission device can be supported in including optical modules with different transmission rates. For example, transmission rates of some optical modules are the same as the transmission rate supported by the FlexE shim layer, and transmission rates of some optical modules are different from the transmission rate supported by the FlexE shim layer. Therefore, compatibility of bundled use of the FlexE shim layer and optical modules with different transmission rates is implemented.

In a possible implementation, each FlexE signal stream includes a plurality of FlexE instance frames, and each FlexE instance frame includes one overhead code block; and each X consecutive FlexE instance frames in $i^{th}$ the FlexE signal stream are distributed to the m signal sub-streams, so that each signal sub-stream of the m signal sub-streams includes at least one overhead code block in the X FlexE instance frames, where X is a positive integer greater than or equal to m. By using the foregoing implementation, it is ensured that each signal sub-stream includes an overhead code block, thereby identifying different signal sub-streams based on the overhead code blocks.

In a possible implementation, each FlexE instance frame includes W payload code blocks. The X FlexE instance frames are distributed, through polling, to the m signal sub-streams by using Y payload code blocks as a granularity, where Y is a positive integer less than or equal to W/m. In the foregoing implementation, distribution is performed in a manner of polling, so that real-time performance of distributing the signal sub-streams can be ensured.

In a possible implementation, the overhead code block included in each signal sub-stream of the m signal sub-streams carries distribution sequence information used to represent a distribution sequence of the signal sub-stream that carries the overhead code block. For example, the distribution sequence information may be an identifier of the signal sub-stream, such as an index number or a serial number. Based on this, after obtaining the signal sub-streams, a receiving end can combine the signal sub-streams into one FlexE signal stream based on the distribution sequence information.

In a possible implementation, locations of overhead code blocks included in any two signal sub-streams of the m signal sub-streams are different. Based on this, locations of different overhead code blocks may be used to indicate the distribution sequence of the signal sub-streams, so that the receiving end can identify the signal sub-streams based on the locations of the overhead code blocks, and determine a sequence of combining the signal sub-streams.

In a possible implementation, an identifier used for indicating that a transmission rate of the signal sub-stream is equal to the first rate/m may be carried in the overhead code block. Specifically, before sending the m padded signal sub-streams, the transmission device on a transmitting end inserts a second identifier into the overhead code block included in each signal sub-stream of the m signal sub-streams. The second identifier is used to indicate that a transmission rate of each signal sub-stream of the m signal sub-streams is equal to the first rate/m. The identifier used for indicating that the transmission rate of the signal sub-stream is equal to the first rate/m may also be carried in the padding code block. Specifically, the padding code block carries a third identifier, and the third identifier is used to indicate that the transmission rate of each signal sub-stream of the m signal sub-streams is the first rate/m. Based on this, after the receiving end obtains the signal sub-streams, if the identifier used for indicating that the transmission rate of the signal sub-stream is equal to the first rate/m is identified, it may be determined that the signal sub-stream is a signal sub-stream needing to be combined; or if the identifier used for indicating that the transmission rate of the signal sub-stream is equal to the first rate/m is not identified, the signal sub-stream does not need to be combined with another signal sub-stream.

According to a second aspect, an embodiment of this application provides a method for transmitting data in a FlexE, including: receiving m padded signal sub-streams by using m first optical modules, where the padded signal sub-streams include padding code blocks; deleting the padding code blocks included in the m padded signal sub-streams, to obtain m signal sub-streams, where each signal sub-stream of the m signal sub-streams carries a first identifier, and the first identifier is used to indicate that the signal sub-stream carrying the first identifier belongs to a first FlexE signal stream; and combining the m signal sub-streams into the first FlexE signal stream based on the first identifier carried in each signal sub-stream of the m signal sub-streams, where a transmission rate of the first FlexE signal stream is a first rate, a rate of the first optical module is greater than the first rate/m, the rate of the first optical module is less than the first rate, and m is an integer greater than or equal to 2. It should be noted that, in this embodiment of this application, a distribution rule of the signal sub-stream is configured on a transmitting end, and a combination rule corresponding to the distribution rule is configured on a receiving end corresponding to the transmitting end. Based on this, after identifying signal sub-streams carrying a same first identifier, the receiving end may combine the m signal sub-streams into the first FlexE signal stream based on the combination rule, so that a transmission rate of the combined FlexE signal stream can meet requirements of a FlexE shim layer. By using the foregoing implementation, when a transmission rate supported by the FlexE shim layer for processing the FlexE signal stream is greater than a transmission rate of the optical module, the signal sub-streams are combined by using the foregoing implementation, thereby improving the transmission rate, so that the improved transmission rate is equal to the transmission rate of the FlexE shim layer. Therefore, compatibility between the FlexE shim layer and the optical module is ensured.

In a possible implementation, the combining the m signal sub-streams into the first FlexE signal stream based on the first identifier carried in each signal sub-stream of the m signal sub-streams may be specifically implemented in the following manner: identifying an overhead code block included in each signal sub-stream of the m signal sub-streams, where the overhead code block carries distribution sequence information that represents the signal sub-stream that carries the overhead code block; and combining the m signal sub-streams into the first FlexE signal stream based on the distribution sequence information and the first identifier carried in each signal sub-stream of the m signal sub-streams.

In a possible implementation, the combining the m signal sub-streams into the first FlexE signal stream based on the first identifier carried in each signal sub-stream of the m signal sub-streams may be specifically implemented in the following manner: identifying the overhead code block included in each signal sub-stream of the m signal sub-streams, where locations of overhead code blocks included in any two signal sub-streams of the m signal sub-streams are different; and combining the m signal sub-streams into the first FlexE signal stream based on a location of the overhead code block included in each signal sub-stream of the m signal sub-streams in each signal sub-stream and the first identifier carried in each signal sub-stream of the m signal sub-streams.

According to a third aspect, an embodiment of this application provides a device for transmitting data in a FlexE, where the device includes: a processor and m first optical modules, where a transmission rate of the processor is a first rate, a rate of the first optical module is greater than the first rate/m, and the rate of the first optical module is less than the first rate; and the processor is configured to perform the method described in any implementation of the first aspect, to obtain m padded signal sub-streams, and send the m padded signal sub-streams by using the m first optical modules.

According to a fourth aspect, an embodiment of this application provides a device for transmitting data in a flexible Ethernet FlexE, where the device includes a processor and m first optical modules, where a transmission rate of the processor is a first rate, a rate of the first optical module is greater than the first rate/m, and the rate of the first optical module is less than the first rate; and the processor is configured to receive m padded signal sub-streams by using the m first optical modules, and perform the method described in any implementation of the second aspect.

According to a fifth aspect, an embodiment of this application provides a system for transmitting data in a FlexE, including: a first transmission device and a second transmission device, where the first transmission device and the second transmission device are connected to each other by using an OTN; the first transmission device is configured to perform the method described in any implementation of the second aspect, map a FlexE signal stream obtained after a combination to a first OTN container, and send the first OTN container to the second transmission device; and the second transmission device is configured to receive the first OTN container, and parse out the FlexE signal stream from the first OTN container. When the transmission devices are interconnected by using the OTN, and a transmission rate of an optical module included in a transmission device on an ingress side is different from a transmission rate of an optical module included in a transmission device on an egress side, compatibility between the transmission device on the ingress side and the transmission device on the egress side is implemented by using the foregoing implementation.

According to a sixth aspect, an embodiment of this application provides a system for transmitting data in a FlexE, including: a first transmission device and a second transmission device, where the first transmission device and the second transmission device are connected to each other by using an OTN; the first transmission device receives m padded signal sub-streams by using m optical modules included in the first transmission device, maps the m padded signal sub-streams to a first OTN container, and sends the first OTN container to the second transmission device; and the second transmission device is configured to receive the first OTN container, parse out the m padded signal sub-streams from the first OTN container, and perform the method described in any implementation of the first aspect on the m padded signal sub-streams. When the transmission devices are interconnected by using the OTN, and a transmission rate of an optical module included in a transmission device on an ingress side is different from a transmission rate of an optical module included in a transmission device on an egress side, compatibility between the transmission device on the ingress side and the transmission device on the egress side is implemented by using the foregoing implementation.

According to a seventh aspect, an embodiment of this application further provides a computer storage medium, where the storage medium stores a software program. When the software program is read and executed by one or more processors, the method provided in any implementation of either of the first aspect and the second aspect may be implemented.

According to an eighth aspect, an embodiment of this application provides a computer program product including an instruction, where when the instruction is run on a computer, the computer is enabled to perform the method provided in any implementation of the first aspect and the second aspect.

According to a ninth aspect, an embodiment of this application provides a chip. The chip is connected to a memory, and is configured to read and execute a software program stored in the memory, to implement the method provided in any implementation of either of the first aspect and the second aspect.

BRIEF DESCRIPTION OF DRAWINGS

FIG. 8A-1 and FIG. 8A-2 are a schematic diagram of a first possible distribution manner according to Embodiment 1 of this application;

FIG. 9A is a schematic diagram of a padding code block according to an embodiment of this application;

FIG. 9B is a schematic diagram of another padding code block according to an embodiment of this application;

FIG. 12B-1 and FIG. 12B-2 are a schematic diagram of a second possible distribution manner according to Embodiment 2 of this application;

FIG. 12C-1 and FIG. 12C-2 are a schematic diagram of a third possible distribution manner according to Embodiment 2 of this application;

FIG. 15A-1 and FIG. 15A-2 are a schematic flowchart of a method in a transmission device aware manner according to Embodiment 4 of this application;

FIG. 15B-1 and FIG. 15B-2 are a schematic flowchart of a method in a transmission device unaware manner according to Embodiment 4 of this application;

DESCRIPTION OF EMBODIMENTS

Figure 1:
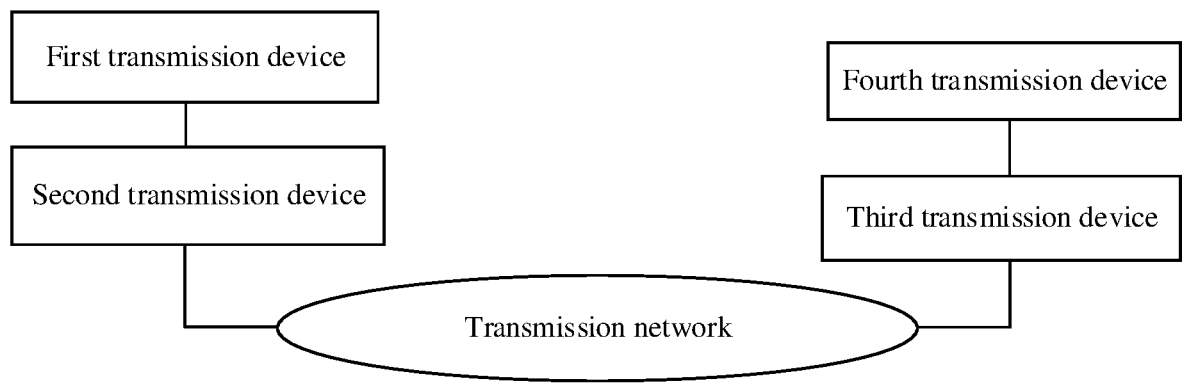
FIG. 1 is a schematic diagram of a system architecture of a FlexE according to an embodiment of this application.

Embodiments of the present application may apply to Flex Ethernet. A schematic diagram of a Flex Ethernet system architecture as shown as an example in FIG. 1. The FlexE system architecture comprises a transmission device directly connected to a transmission network, for instance, the second transmission device, and the third transmission device, and also includes transmission devices that do not directly connect the transmission network, such as the first transmission device and the fourth transmission device. The transmission device may be a FlexE device or an optical transmission network (OTN) device. The transmission network may be OTN based on wavelength division multiplexing, and the transmission device directly connected may be an OTN device or a FlexE device having the functions of an OTN device. It should be noted that the transmission network in FIG. 1 is optional. That is, transmission equipment can be networked through direct interconnection.

In the following, some terms in this application will be described to be understood easily by those skilled in the art.

Figure 2:
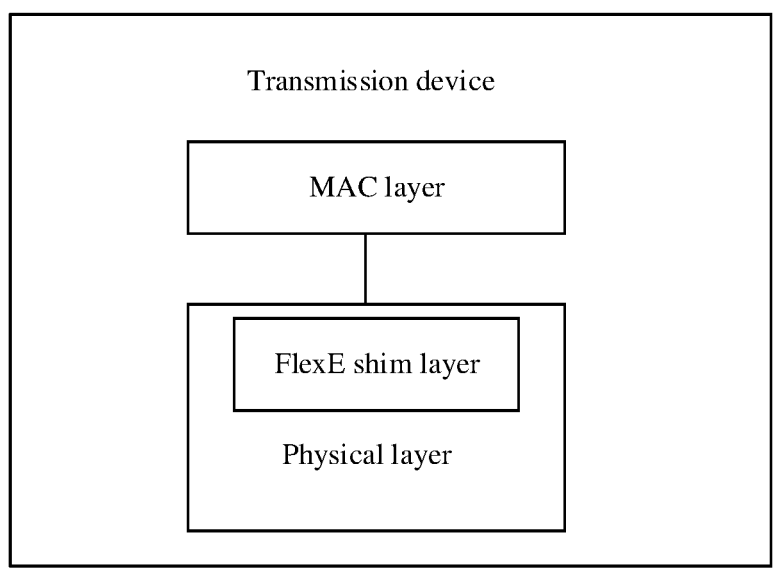
FIG. 2 is a schematic structural diagram of a transmission device according to an embodiment of this application.

The transmission device in the embodiments of the present application may include a MAC layer and a physical layer, and a FlexE shim layer is defined in the physical layer. As shown in FIG. 2, the FlexE shim layer adopts n-channel 100 Gigabit Ethernet (GE) rate. It mainly uses the time division multiplexing mechanism to schedule and distribute data of multiple FlexE client interfaces with different transmission rates, according to the time slot method, as n FlexE instance frames with a transmission rate of 100 Gbit/s. In the prior art, the FlexE shim layer perform other physical layer processing on n FlexE signal streams and transmits them to n 100 GE optical modules respectively. The transmission rate of the FlexE signals supported by the FlexE Shim layer is 100 Gbit/s. In the following, for convenience of description, the n*100 Gbit/sFlexE Shim layer is simply referred to as n*100 G FlexE Shim layer.

The FlexE shim layer divides the time domain resources of the optical module with a transmission rate of 100 Gbit/s into 20 time slots, and takes 20 time slots as a cycle to send and receive data, where each time slot is used to transmit payload code blocks. The data format used by the FlexE shim layer is FlexE instance frame. The FlexE instance frame is composed of overhead code blocks (OH) and payload code blocks.

Figure 3:
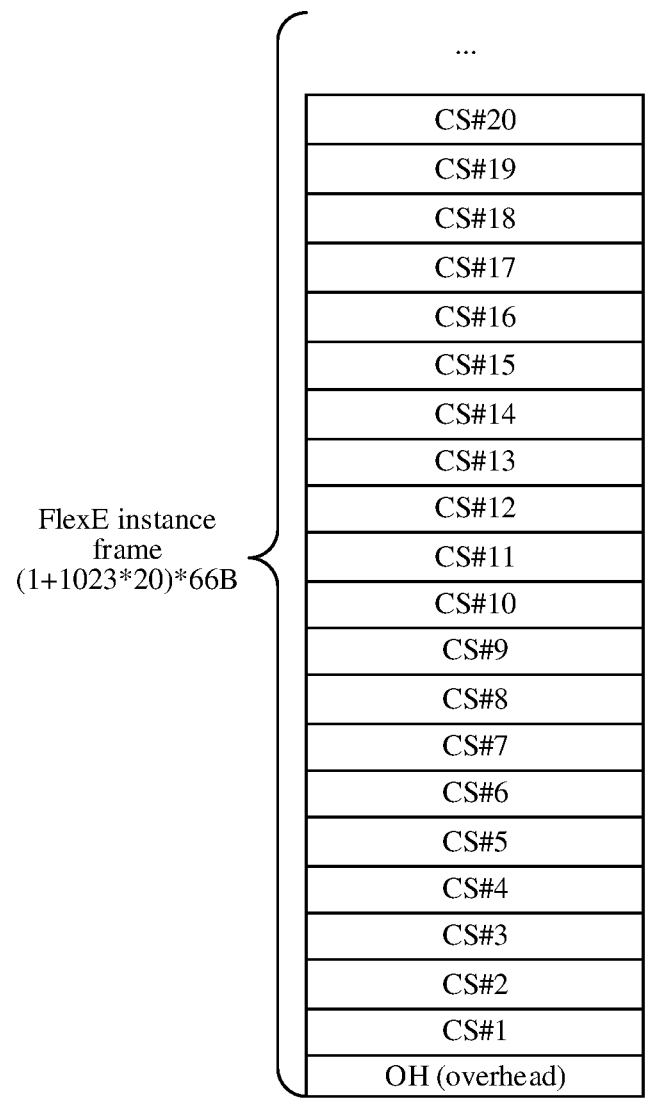
FIG. 3 is a schematic diagram of a FlexE instance frame according to an embodiment of this application.

In the embodiments of the present application, "*" can indicate a multiplication sign. Specifically, referring to FIG. 3, there is an overhead code block before every 20*1023 consecutive payload code blocks, and there is no other payload code block or overhead code block between the overhead code block and 20*1023 consecutive payload code blocks. The sizes of the overhead code block and the payload code block are equal, for example, both are equal to 66B. When the transmission rate of the FlexE shim layer is 100 Gbit/s, the size of each FlexE instance frame is 100 G. In FIG. 3, OH represents an overhead code block, and CS #1 to CS #20 represent the 1st to 20th payload code blocks.

It should be noted that "multiple" in the present disclosure can mean "two or more." In the present disclosure, the words "first" and "second" are only used to distinguish the description, and cannot be understood as indicating or implying relative importance, or as indicating or implying the order.

At present, IEEE802.3 is gradually completing the definition of low-speed optical modules such as 25 GE and 50 GE. Based on this, when the transmission equipment uses low-rate optical modules such as 25 GE and 50 GE, the following problems will occur:

Problem 1: The FlexE Shim layer currently supporting n*100 Gbit/s is not compatible with low-speed optical modules such as 25 GE and 50 GE.

Figure 4:
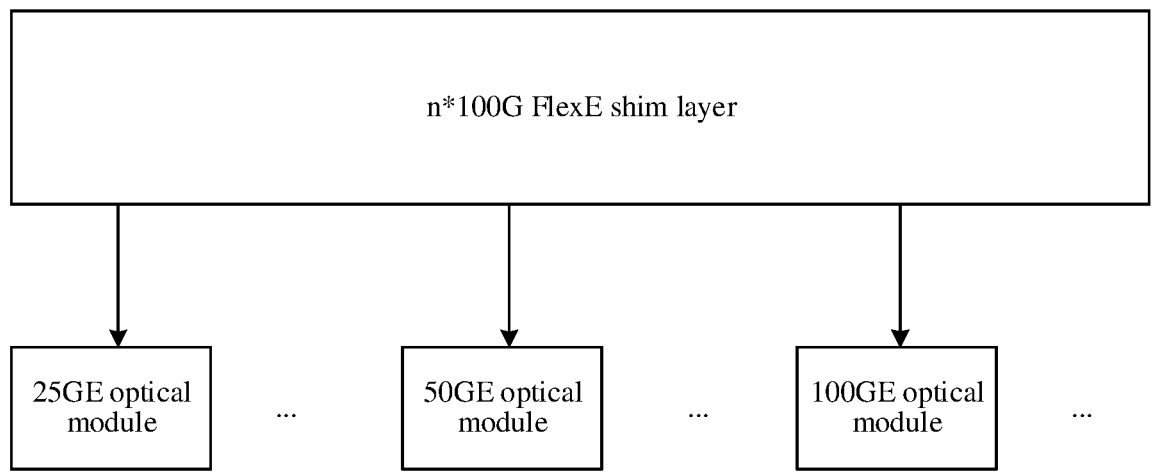
FIG. 4 is a schematic structural diagram of a transmission device according to an embodiment of this application.

Problem 2: At present, only optical modules with the same transmission rate are bundled, that is, optical modules with 100 GE are used. When optical modules with different transmission rates are bundled, the FlexE Shim layer with a transmission rate of n*100 Gbit/s is not compatible. See FIG. 4 as an example.

Figure 5:
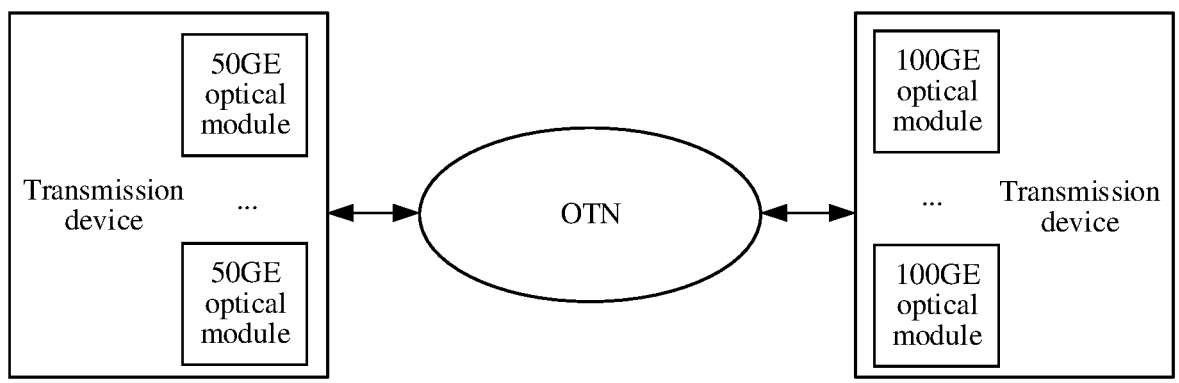
FIG. 5 is a schematic diagram of an OTN system according to an embodiment of this application.

Problem 3: When the transmission network uses OTN, when an optical module of the transmission equipment used on the entrance side of the OTN and an optical module included on the exit side supports different transmission rates, for example, the transmission equipment on the entrance side includes m 25 GE or 50 GE optical modules, the transmission equipment on the exit side includes n 100 GE optical modules. FIG. 5 shows an example as how to achieve compatibility between the transmission equipment on the entrance side and the transmission equipment on the exit side. The transmission device on the entrance side and the transmission device on the exit side support an OTN transmission function.

Based on this, this application provides a method, a device, and a system for transmitting data, to resolve existing problems in the conventional technology. The method and the device are based on a same inventive concept. Because principles on which the method and the device resolve problems are similar, cross reference may be made to implementations of the device and the method. Of course, the implementation is not limited to the device and the method.

Figure 6:
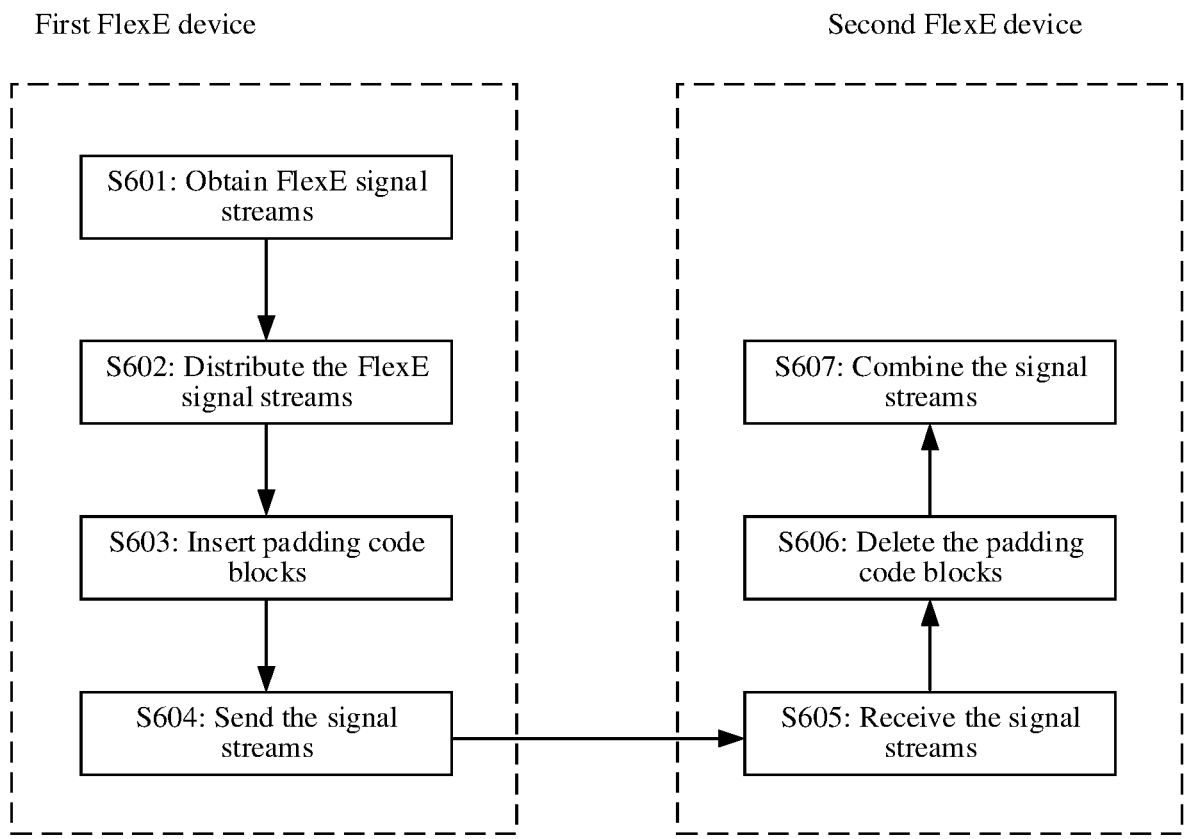
FIG. 6 is a schematic flowchart of a method for transmitting data in a FlexE according to an embodiment of this application.

FIG. 6 shows a method for transmitting data in a flexible Ethernet according to an embodiment of this application. The method may be implemented by a transmission device, for example, a FlexE device or an OTN device. Specifically, the method may be implemented by a processing chip or a module having functions of a FlexE shim layer. Subsequently, the FlexE device is used as an example for description. In this embodiment of this application, description is made by using an example in which a transmitting end is a first FlexE device and a receiving end is a second FlexE device. The first FlexE device on the transmitting end includes a first FlexE shim layer at an n*first rate and m*n first optical modules at a second rate. The second FlexE device on the receiving end includes a second FlexE shim layer at an n*first rate and m*n second optical modules at a second rate.

S601. Obtain FlexE Signal Streams.

Specifically, the first FlexE shim layer in the first FlexE device obtains n FlexE signal streams, and a transmission rate of each FlexE signal stream is the first rate.

S602. Distribute the FlexE Signal Streams.

Specifically, the first FlexE shim layer distributes a first FlexE signal stream into m signal sub-streams. Each signal sub-stream of the m signal sub-streams carries a first identifier, and the first identifier is used to indicate that the signal sub-stream carrying the first identifier belongs to the first FlexE signal stream. The first FlexE signal stream is any one of the n FlexE signal streams, and m is an integer greater than or equal to 2.

Optionally, the first identifier may be a serial number or an index number of the first FlexE signal stream. Alternatively, another identifier that may be used to indicate the first FlexE signal stream is also applicable to this embodiment of this application.

S603. Insert Padding Code Blocks.

Specifically, the first FlexE shim layer inserts a preset quantity of padding code blocks into each signal sub-stream of the m signal sub-streams, to obtain m padded signal sub-streams, so that a transmission rate of each of the m padded signal sub-streams is equal to a rate of the first optical module.

It should be noted that, a transmission rate of the first optical module is the second rate, the second rate is greater than the first rate/m, and the second rate is less than the first rate, so that the preset quantity of padding code blocks need to be inserted for each signal sub-stream. It should be appreciated that when the transmission rate of the first optical module is equal to the first rate/m, step S603 may no longer need to be performed.

Optionally, the padding code block in this embodiment of this application carries information used for indicating that the padding code block is different from the overhead code block and the payload code block. For example, a size of the padding code block is equal to sizes of the overhead code block and the payload code block, and each of the sizes is 66B. A value of a tenth to a thirteenth bits of the padding code block is 0x3, thereby indicating that the code block is a padding code block PAD. The padding code block may be of a code block type the same as that of the overhead code block. That is, a value of a second to a ninth bits is 0x4b, to indicate that the code block type of the padding code block is the same as that of the overhead code block.

S604. Send the Signal Streams.

Specifically, the first FlexE shim layer sends the m padded signal sub-streams by using m first optical modules.

One padded signal sub-stream corresponds to one first optical module. The first FlexE shim layer sends the m padded signal sub-streams to the m first optical modules respectively. After performing physical layer processing on the m padded signal sub-streams, the first optical modules send the m padded signal sub-streams to the second FlexE device on the receiving end.

S605. Receive the Signal Streams.

Specifically, the second FlexE shim layer in the second FlexE device receives the m padded signal sub-streams by using m second optical modules. The padded signal sub-streams include padding code blocks.

S606. Delete the Padding Code Blocks.

Specifically, the second FlexE shim layer deletes the padding code blocks included in the m padded signal sub-streams, to obtain the m signal sub-streams.

Each signal sub-stream of the m signal sub-streams carries the first identifier. The first identifier is used to indicate that the signal sub-stream carrying the first identifier belongs to the first FlexE signal stream.

S607. Combine the Signal Streams.

Specifically, the second FlexE shim layer combines the m signal sub-streams into the first FlexE signal stream based on the first identifier carried in each signal sub-stream of the m signal sub-streams. A transmission rate of the first FlexE signal stream is the first rate, the rate of the first optical module is greater than the first rate/m, the rate of the first optical module is less than the first rate, and m is an integer greater than or equal to 2.

In this embodiment of this application, each FlexE signal stream includes a plurality of FlexE instance frames, and each FlexE instance frame includes one overhead code block. Therefore, when the first FlexE shim layer distributes the first FlexE signal stream into the m signal sub-streams, each X consecutive FlexE instance frames in the first FlexE signal stream may be distributed to the m signal sub-streams. Therefore, it is ensured that each signal sub-stream of the m signal sub-streams includes at least one overhead code block in the X FlexE instance frames. X is a positive integer greater than or equal to m. For example, when X=m=2, an overhead code block of a first FlexE instance frame may be distributed to a first signal sub-stream, and an overhead code block of a second FlexE instance frame may be distributed to a second signal sub-stream.

Optionally, in this embodiment of this application, after step S602 and before step S604, the first FlexE shim layer may insert a second identifier into the overhead code block included in each signal sub-stream of the m signal sub-streams. The second identifier is used to indicate that a transmission rate of each signal sub-stream of the m signal sub-streams is equal to the first rate/m. For example, if the first rate is 100 Gbit/s and m is equal to two, the second identifier is used to indicate that a transmission rate of each signal sub-stream is 50 Gbit/s, that is, used to indicate that the signal sub-stream is a low-rate signal sub-stream compared with the existing signal stream of 100 Gbit/s.

Based on this, after step S606 and before step S607, that is, after the second FlexE shim layer on the receiving end deletes the padding code blocks included in the m padded signal sub-streams to obtain the m signal sub-streams, if a signal sub-stream carrying the second identifier in the overhead code block is identified, it is determined that the signal sub-stream is a signal sub-stream needing to be combined.

Optionally, in this embodiment of this application, after step S603 and before step S604, the first FlexE shim layer may alternatively insert the second identifier into the padding code block inserted in each signal sub-stream of the m signal sub-streams. Based on this, after step S605 and before step S606 (i.e., after the second FlexE shim layer receives the m padded signal sub-streams by using the m second optical modules), if a padded signal sub-stream carrying the second identifier in the padding code block is identified, it is determined that the padded signal sub-stream is a padded signal sub-stream needing to be combined.

It should be noted that, as an example, the first FlexE device in FIG. 6 directly sends a signal to the second FlexE device. The first FlexE device and the second FlexE device may be further interconnected by using another device, for example, another FlexE device or an OTN device provided with a FlexE processing capability.

The embodiments of this application are described in detail below with reference to specific application scenarios.

Embodiment 1 is described in detail by using an example in which n*100 G FlexE shim layers are interconnected with 2*n 50 GE optical modules, and is used to resolve the problem 1.

Figure 7:
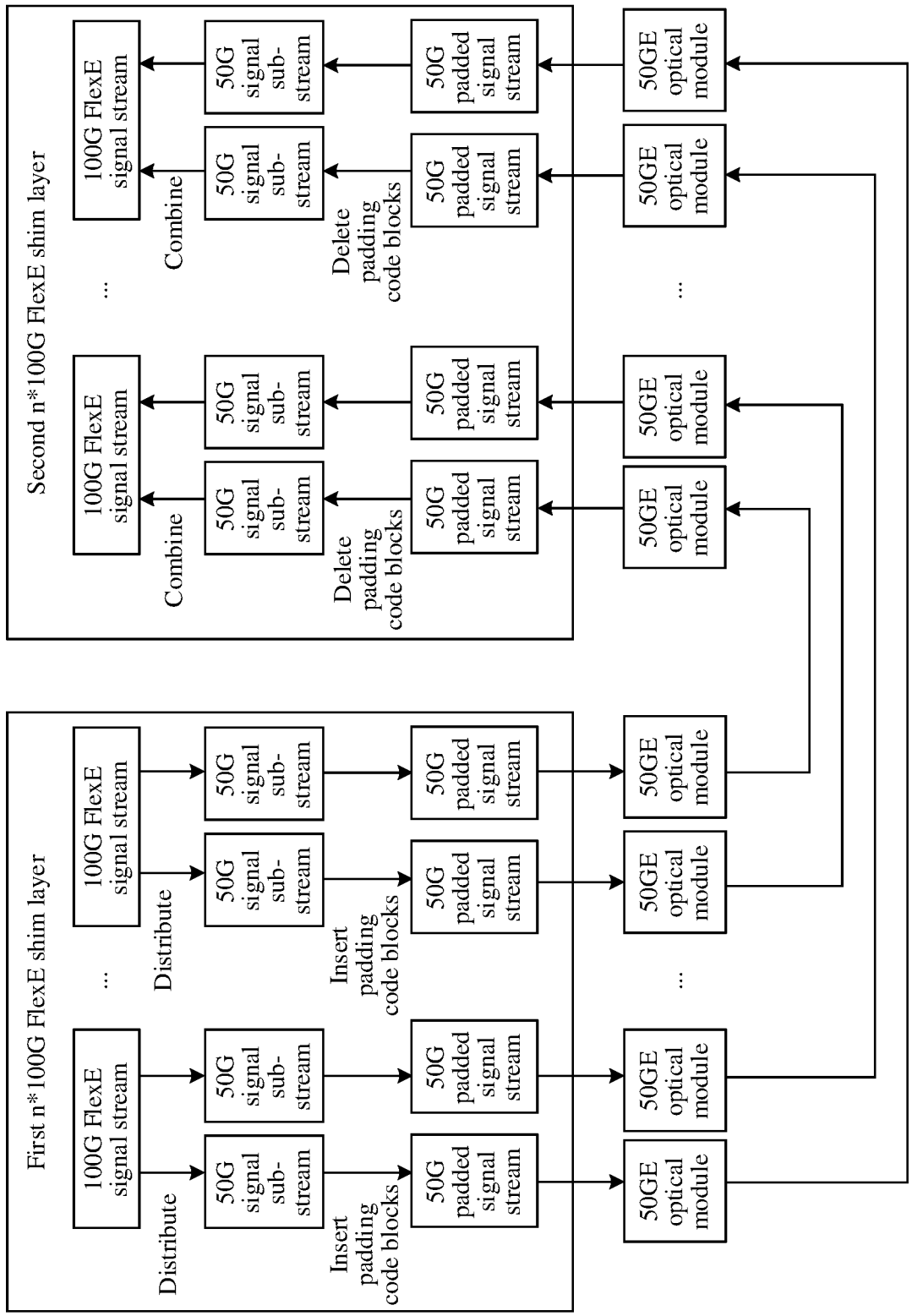
FIG. 7 is a schematic diagram of compatibility between an n*100 G FlexE shim layer and a 50 G optical module according to Embodiment 1 of this application.

Referring to FIG. 7, a first n*100 G FlexE shim layer and 2*n first 50 GE optical modules are used on the transmitting end. A second n*100 G FlexE shim layer and 2*n second 50 GE optical modules are used on the receiving end. Transmission rates of the first 50 GE optical module and the second 50 GE optical module are 51.5625 Gbit/s.

On the transmitting end, the first n*100 G FlexE shim layer performs steps S601 to S604 shown in FIG. 6. Details are as follows:

A1. Obtain FlexE signal streams. The first n*100 G FlexE shim layer obtains the n FlexE signal streams. For details, refer to step S601.

A2. Distribute the FlexE signal streams. For details, refer to step S602. The first FlexE shim layer distributes each FlexE signal stream into two signal sub-streams provided that an overhead code block periodically occurs in each signal sub-stream. A specific distribution manner is not specifically limited in this application. The overhead code block in each signal sub-stream may carry a first identifier. For details, refer to related descriptions in FIG. 6.

A plurality of distribution manners of distributing each FlexE signal stream into two signal sub-streams are used as examples below. Specifically, the first FlexE signal stream is used as an example. For another FlexE signal stream, refer to the implementation described for the first FlexE signal stream.

First Possible Distribution Manner

Figures 1, 8A:
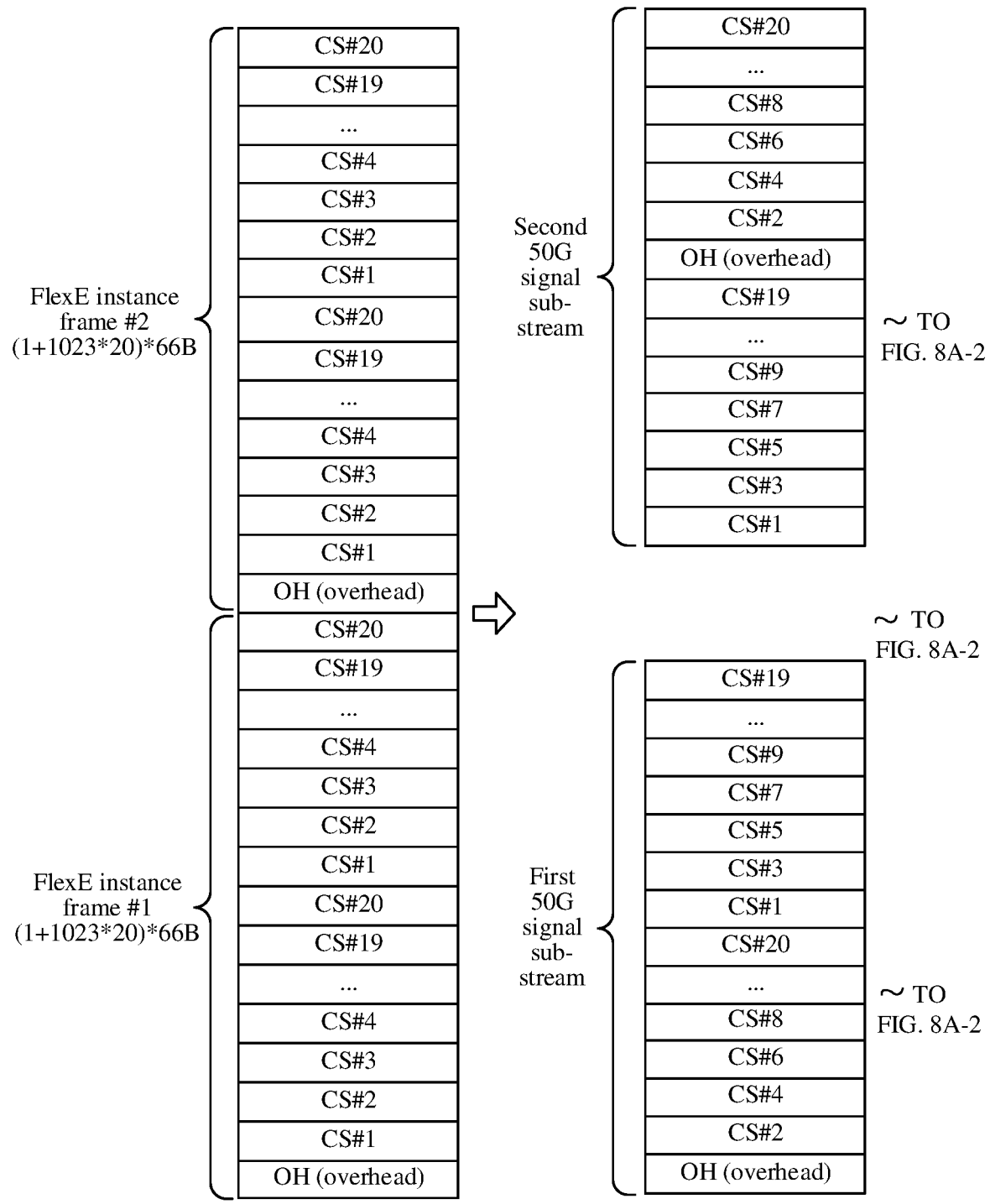
Figures 2, 8A:
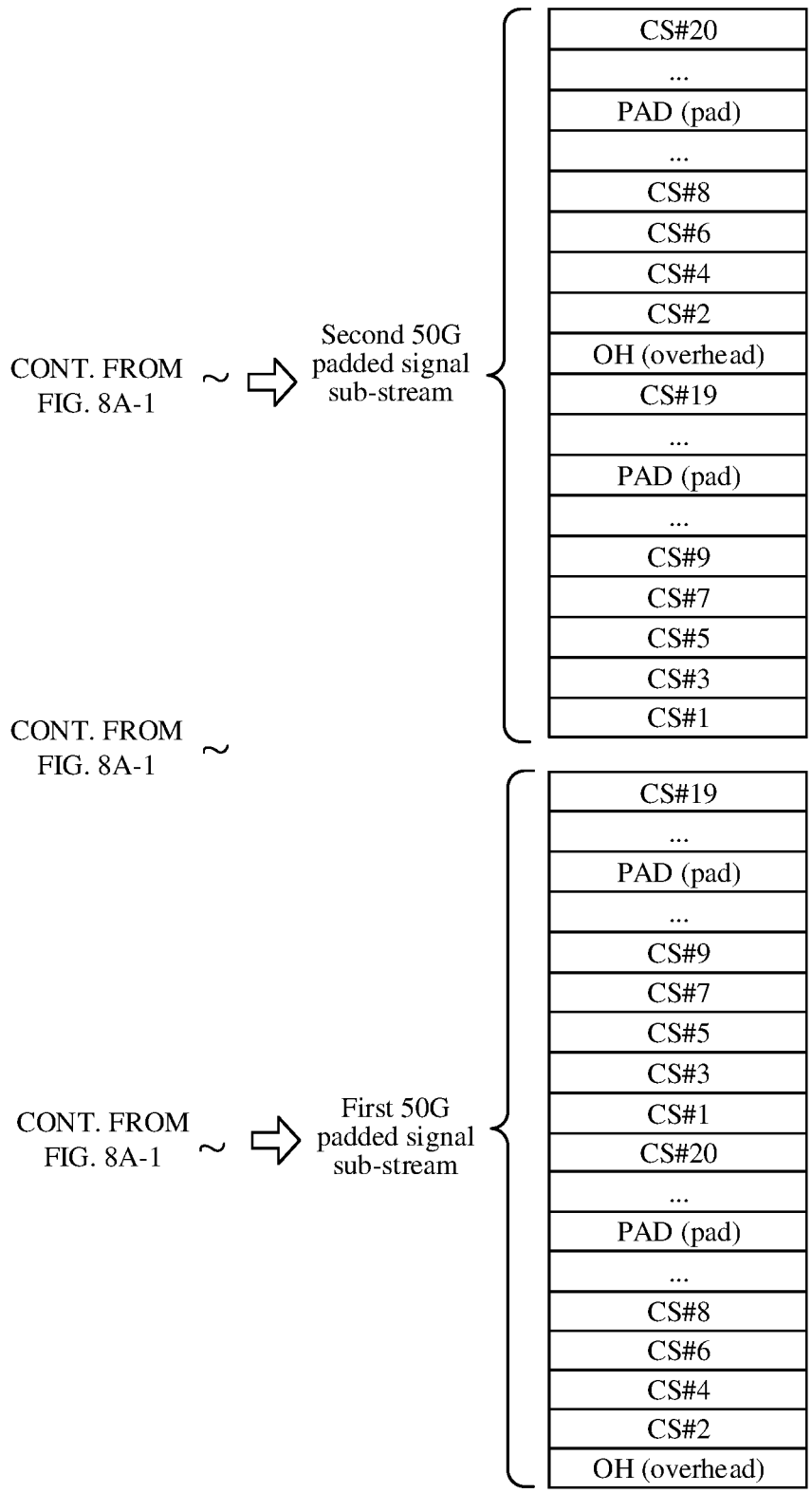

The first FlexE signal stream uses two FlexE instance frames as a period, and is distributed, through polling, into two signal sub-streams by using one 66B code block as a granularity. For example, refer to FIG. 8A-1 and FIG. 8A-2. In FIG. 8A-1 and FIG. 8A-2, OH represents an overhead code block, and CS #1 to CS #20 represent payload code blocks respectively belonging to a first to a twentieth calendar slots.

After the distribution, each signal sub-stream maintains a periodic pattern:

A periodic pattern of a first 50 G signal sub-stream is: OH, 1023*(CS #2, CS #4, CS #6, . . . , CS #20), 1023*(CS #1, CS #3, CS #5, . . . , CS #19).

A periodic pattern of a second 50 G signal sub-stream is: 1023*(CS #1, CS #3, CS #5, . . . , CS #19), OH, 1023*(CS #2, CS #4, CS #6, . . . , CS #20).

Based on the first possible distribution manner, for a periodic pattern of each padded signal sub-stream into which the padding code blocks are inserted, refer to FIG. 8A-1 and FIG. 8A-2.

Figure 8B:
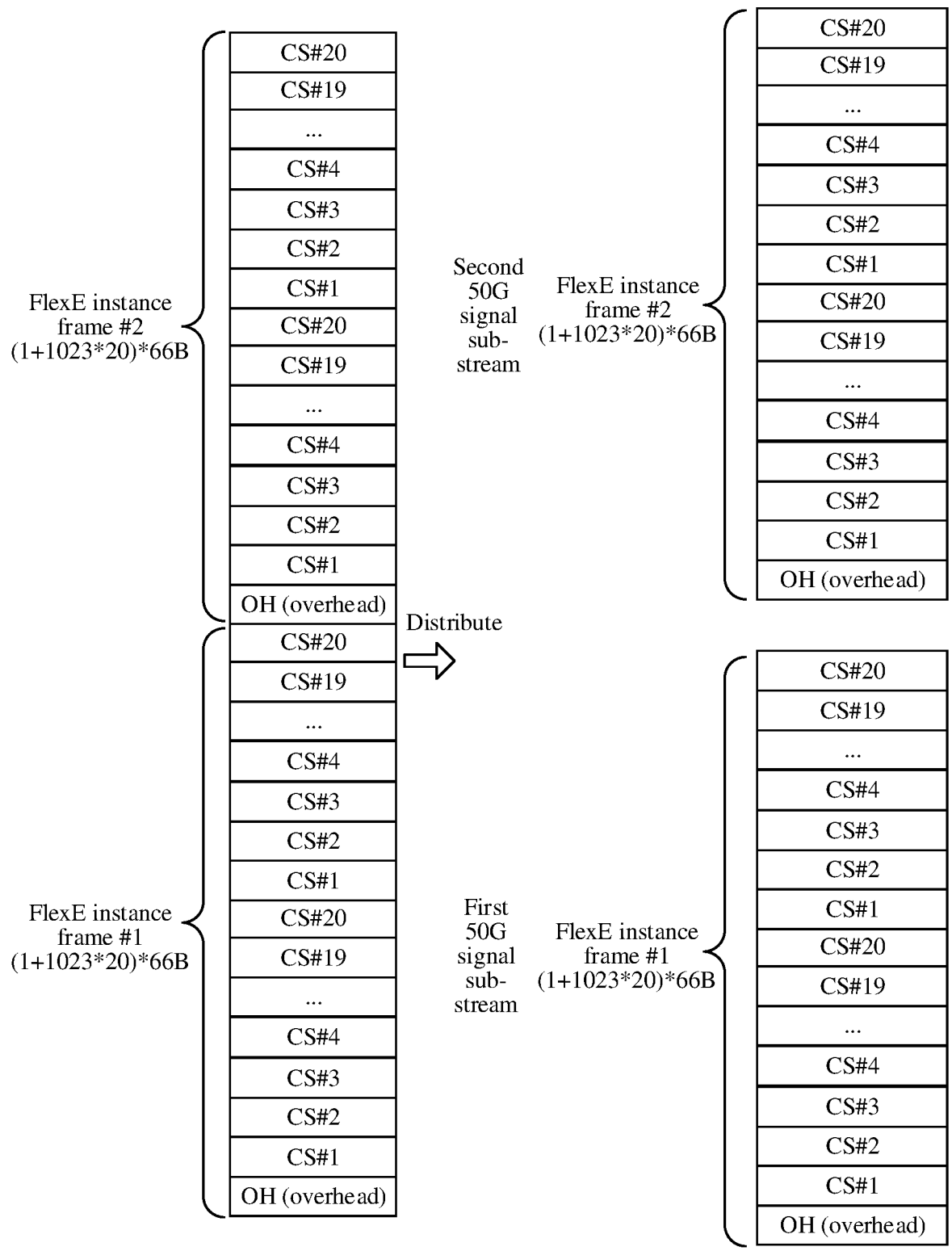
FIG. 8B is a schematic diagram of a second possible distribution manner according to Embodiment 1 of this application.

Second possible distribution manner: The first FlexE signal stream uses two FlexE instance frames as a period, and is distributed, through polling, into two signal sub-streams by using one FlexE instance frame as a granularity. For example, refer to FIG. 8B.

Figure 8C:
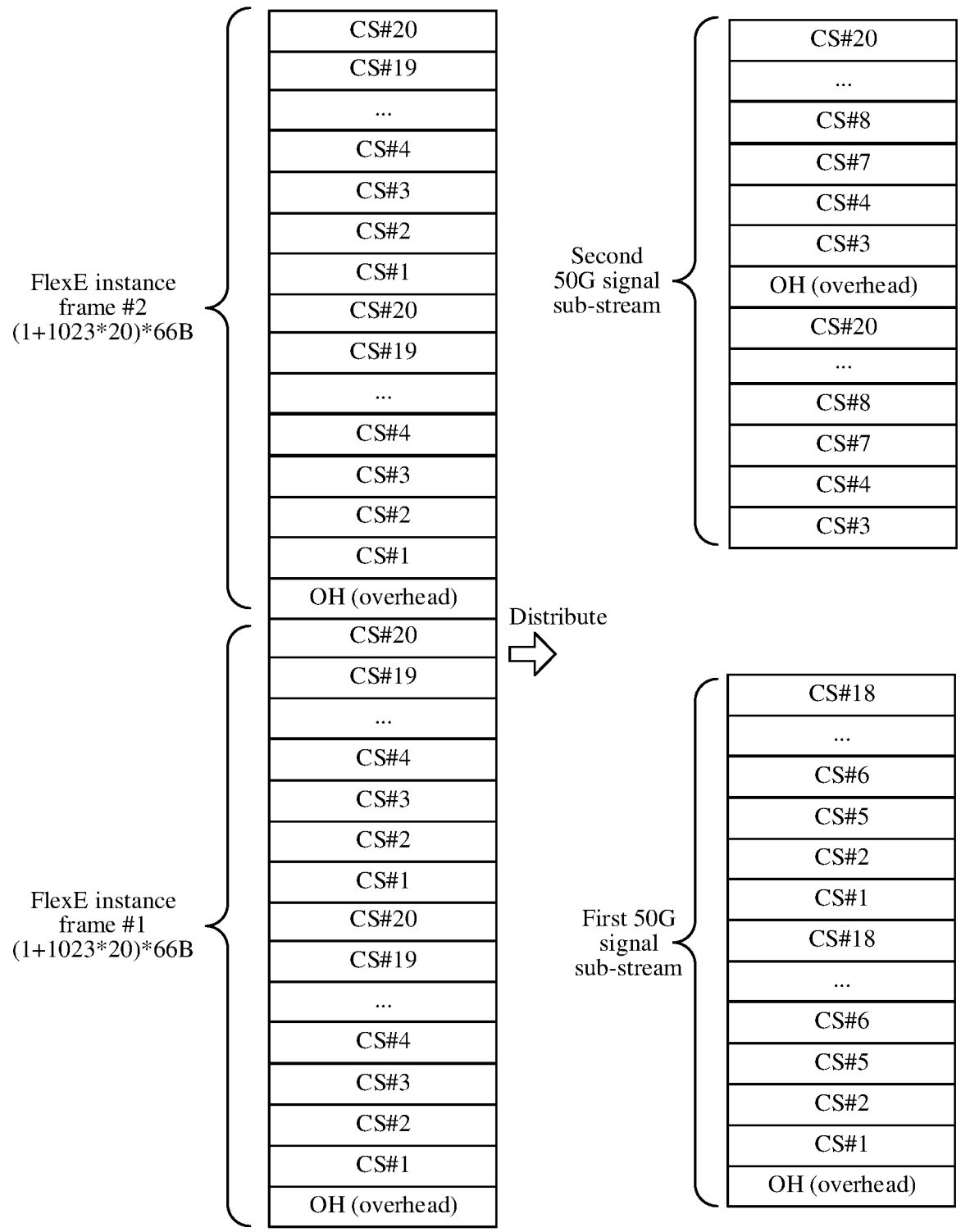
FIG. 8C is a schematic diagram of a third possible distribution manner according to Embodiment 1 of this application.

Third possible distribution manner: The first FlexE signal stream uses two FlexE instance frames as a period, and two overhead code blocks included in the two FlexE instance frames are distributed to two signal sub-streams. Payload code blocks included in each FlexE instance frame are distributed, through polling, to the two signal sub-streams by using a plurality of payload code blocks as a granularity. For example, referring to FIG. 8C, the payload code blocks included in each FlexE instance frame are distributed, through polling, to two signal sub-streams by using two payload code blocks as a granularity.

After the distribution, each signal sub-stream maintains a periodic pattern:

A periodic pattern of a first 50 GE signal sub-stream is: OH, 1023*(CS #1, CS #2, CS #5, CS #6, . . . , CS #17, CS #18), 1023*(CS #1, CS #2, CS #5, CS #6, . . . , CS #17, CS #18).

A periodic pattern of a second 50 GE signal sub-stream is: 1023*(CS #3, CS #4, CS #7, CS #8, . . . , CS #19, CS #20), OH, 1023*(CS #3, CS #4, CS #7, CS #8, . . . , CS #19, CS #20).

Fourth possible distribution manner: The first FlexE signal stream uses more than two FlexE instance frames as a period, for example, uses three FlexE instance frames as a period, and three overhead code blocks included in the three FlexE instance frames are distributed to two signal sub-streams. One signal sub-stream includes two overhead code blocks, and the other signal sub-stream includes one overhead code block.

Optionally, each signal sub-stream includes distribution sequence information used to indicate a distribution sequence of the signal sub-stream in a FlexE signal stream to which the signal sub-stream belongs.

In a first possible implementation, the overhead code block in each signal sub-stream may carry the distribution sequence information. The distribution sequence information may be an index number or a serial number of the distribution sequence of the signal sub-stream, or other information used for identifying the signal sub-stream. The first possible implementation is applicable to the foregoing first to fourth possible distribution manners. For example, if one FlexE signal stream is distributed into two signal sub-streams, the distribution sequence information may be represented by using one bit. For example, 0 represents the first 50 G signal sub-stream, and 1 represents the second 50 G signal sub-stream.

In addition, the distribution sequence information and the first identifier may be jointly indicated by using a plurality of bits. For example, in the foregoing first possible distribution manner, using an example in which a quantity n of FlexE signal streams is equal to 4, two bits are required to represent the first identifier, and one bit is required to represent the distribution sequence information. Specifically, three bits may be used to jointly indicate a FlexE signal stream for which each signal sub-stream is distributed and a distribution sequence of each signal sub-stream. For example, for the first 50 GE signal sub-stream into which the first FlexE signal stream is distributed, three consecutive bits in the OH of the first 50 GE signal sub-stream are "000". The first two bits "00" indicate that the signal sub-stream belongs to the first FlexE signal stream. The last one bit "0" indicates that code blocks are preferentially distributed to the signal sub-stream for the first FlexE signal stream, and is specifically used to indicate the first signal sub-stream. How to allocate bits to indicate the first identifier and the foregoing distribution sequence information is not limited in the present invention.

In a second possible implementation, the distribution sequence of the signal sub-stream is indicated by using periodically occurring locations of the overhead code blocks in the signal sub-streams. For example, in the first possible distribution manner, an overhead code block preferentially occurs in the first 50 GE signal sub-stream. According to the distribution sequence, it is determined that the first 50 GE signal sub-stream is distributed preferentially, and the OH in the second 50 GE signal sub-stream occurs after a preset quantity of payload code blocks. In other words, in this manner, additional information is not required, and the signal sub-streams are directly identified by using special locations of the overhead code blocks arranged in the signal sub-streams.

A3. Insert Padding Code Blocks. For Details, Refer to Step S603:

After the first FlexE shim layer distributes the first FlexE signal stream into two signal sub-streams, because a corresponding transmission rate of the first 50 GE optical module at a physical coding sublayer is 51.5625 Gbit/s, considering a difference between periods of inserting an alignment marker (AM) by using a 100 GE optical module and inserting an alignment marker by using the 50 GE optical module, rate adaptation needs to be performed. Specifically, it is determined that a rate to be compensated is ($\frac{1}{16}k - \frac{1}{20}k$) *51.5625 Gbit/s. One 66B padding code block PAD may be inserted at an interval of 80 k code blocks, thereby obtaining 2*n padded signal sub-streams, where k is 1024.

Optionally, the padding code block in this embodiment of this application carries information used for indicating that the padding code block is different from the overhead code block and the payload code block. For example, as shown in FIG. 9A, a size of the padding code block is equal to sizes of the overhead code block and the payload code block, and each of the sizes is 66B. A zeroth and a first bits are a synchronization header, and a value of the synchronization header is binary 10 used to indicate that the padding code block is a control code block; a second to a ninth bits are used to represent a code block type, and a value of the code block type is 0x4b used to indicate that the padding code block is of a code block type the same as that of the overhead code block of the FlexE instance frame; a value of a tenth to a thirteenth bits is 0x3 used to indicate that the 66B code block is a padding code block PAD to be distinguished from the overhead code block in the FlexE instance frame; each of a fourteenth to a thirty-third bits is padded with 1; a value of a thirty-fourth to a thirty-seventh bits is 0xa; and each of a thirty-eighth to a sixty-fifth bits is padded with 0.

Optionally, the padding code block in this embodiment of this application may alternatively carry the second identifier.

For the descriptions of the second identifier, refer to the embodiment corresponding to FIG. 6. When the second identifier is carried, some bits of the padding code block may be occupied to indicate the transmission rate of the signal sub-stream. For example, a format of a padding code block shown in FIG. 9B may be used. The format in FIG. 9B is different from that in FIG. 9A in that an identifier for indicating a transmission rate is added. As shown in FIG. 9B, a value of a tenth and an eleventh bits is 0x1 or 0x2. For example, 0x1 is used to indicate that a transmission rate of each signal sub-stream is 50 Gbit/s, and 0x2 is used to indicate that a transmission rate of each signal sub-stream is 25 Gbit/s.

A3. Send the signal streams. Specifically, the first FlexE shim layer sends the 2*n padded signal sub-streams to a second transmission device on the receiving end by using 2*n optical modules.

On the receiving end, the second n*100 G FlexE shim layer performs steps S605 to S607 shown in FIG. 6.

It should be noted that, a distribution manner (also referred to as a distribution rule) used to indicate any one of the foregoing possible distribution manners is configured on the transmitting end, and a combination rule corresponding to the distribution manner is configured on the receiving end corresponding to the transmitting end.

B1. Receive the signal streams. Referring to step S605, the second FlexE shim layer in the second transmission device receives the 2*n padded signal sub-streams by using the 2*n second 50 GE optical modules.

B2. Delete the padding code blocks. Referring to step S606, the second FlexE shim layer deletes the padding code blocks included in the 2*n padded signal sub-streams to obtain 2*n signal sub-streams.

The second FlexE shim layer identifies the padding code block PAD in the padded signal sub-streams. For example, using the padding code block PAD shown in FIG. 9A as an example, the padding code block may be identified by using the synchronization header carried in the padding code block PAD. The padding code block may alternatively be identified by using a pattern including 66B bit information included in the padding code block shown in FIG. 9A. The padding code block may be further searched for based on an insertion rule for inserting the padding code blocks. For example, one padding code block is inserted at an interval of a preset quantity of 66B code blocks. Therefore, when the receiving end deletes the padding code blocks, one padding code block may be deleted at the interval of a preset quantity of 66B code blocks.

Each signal sub-stream carries the first identifier, where the first identifier is used to indicate a FlexE signal stream to which the signal sub-stream carrying the first identifier belongs.

B3. Combine the signal streams. For details, refer to step S607. The second FlexE shim layer combines each two signal sub-streams in the 2*n signal sub-streams into one FlexE signal stream based on the first identifier carried in each signal sub-stream.

The second FlexE shim layer identifies two signal sub-streams carrying the same first identifier, and combines the two signal sub-streams carrying the same first identifier into one FlexE signal stream based on the combination rule.

Optionally, when each signal sub-stream includes, in the first possible implementation, the distribution sequence information used for indicating that the signal sub-stream is in the FlexE signal stream to which the signal sub-stream belongs, the second FlexE shim layer may specifically combine, in the following manner, the two signal sub-streams carrying the same first identifier into one FlexE signal stream based on the combination rule:

The second FlexE shim layer identifies an overhead code block included in each signal sub-stream, where the overhead code block carries distribution sequence information. Each two signal sub-streams of the 2*n signal sub-streams are combined into one FlexE signal stream based on the distribution sequence information, the first identifier carried in each signal sub-stream of the m signal sub-streams, and the combination rule.

Optionally, when each signal sub-stream includes, in the second possible implementation, the distribution sequence information used for indicating a distribution sequence of the signal sub-stream in the FlexE signal stream to which the signal sub-stream belongs, each two signal sub-streams of the 2*n signal sub-streams may be combined, at the second FlexE shim layer, into one FlexE signal stream based on a location of the overhead code block included in each signal sub-stream in each signal sub-stream, the first identifier carried in each signal sub-stream, and the combination rule.

Figure 10:
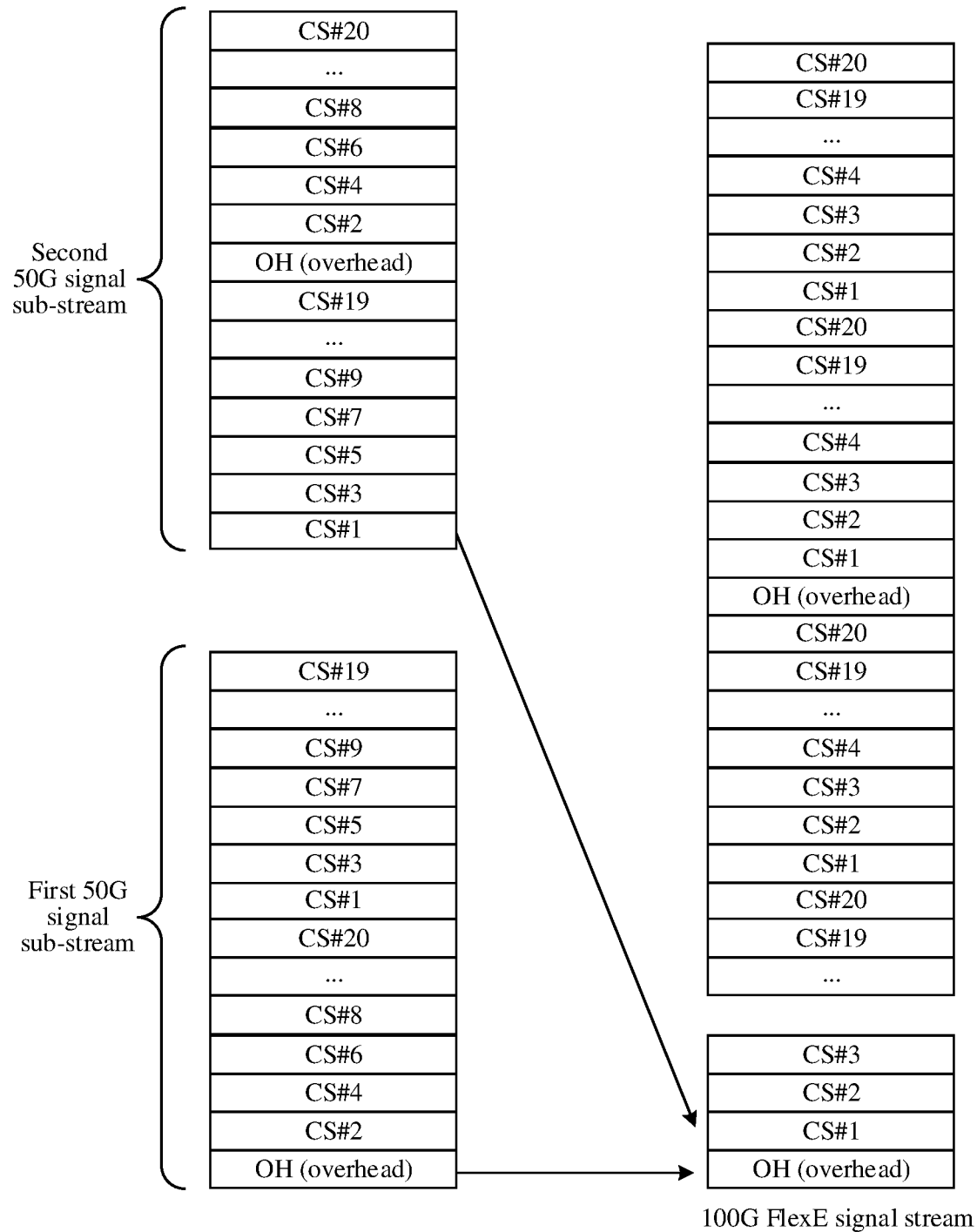
FIG. 10 is a schematic diagram of a signal stream combination manner according to an embodiment of this application.

For example, using an example in which the first possible distribution manner is used, the second FlexE shim layer may identify, by using the first identifier, two signal sub-streams needing to be combined, and determine a first signal sub-stream and a second signal sub-stream by using locations of overhead code blocks in the two signal sub-streams. Then, the first signal sub-stream and the second signal sub-stream are sequentially inserted and combined, by using a 66B code block as a granularity, into one FlexE signal stream by using the combination rule corresponding to the first possible distribution manner, as shown in FIG. 10.

Figure 11:
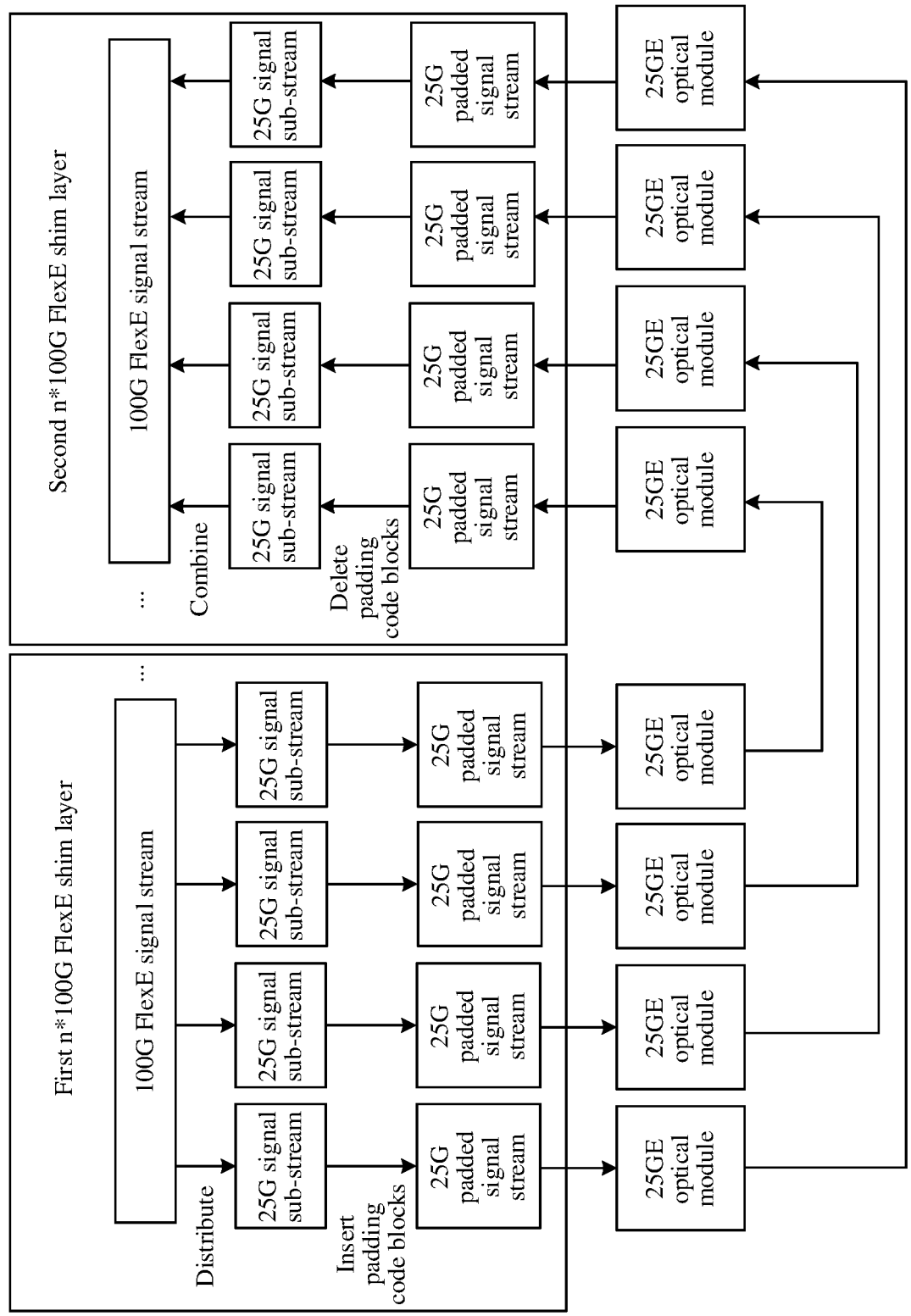
FIG. 11 is a schematic diagram of compatibility between an n*100 G FlexE shim layer and a 25 G optical module according to Embodiment 2 of this application.

Embodiment 2 is described in detail by using an example in which n*100 G FlexE shim layers are interconnected with 4*n 25 GE optical modules, and is used to resolve the problem 1. Referring to FIG. 11, a first n*100 G FlexE shim layer and 4*n first 25 GE optical modules are used on the transmitting end, and a second n*100 G FlexE shim layer and 4*n second 25 GE optical modules are used on the receiving end.

Similar to Embodiment 1, on the transmitting end, the first n*100 G FlexE shim layer performs steps S601 to S604 in FIG. 6. A difference is in that rates of optical modules used by a transmission device in this embodiment are different. When a FlexE signal stream is distributed, a plurality of distribution manners of distributing each FlexE signal stream into four signal sub-streams are used as examples below. Specifically, the first FlexE signal stream is used as an example.

Figure 12A:
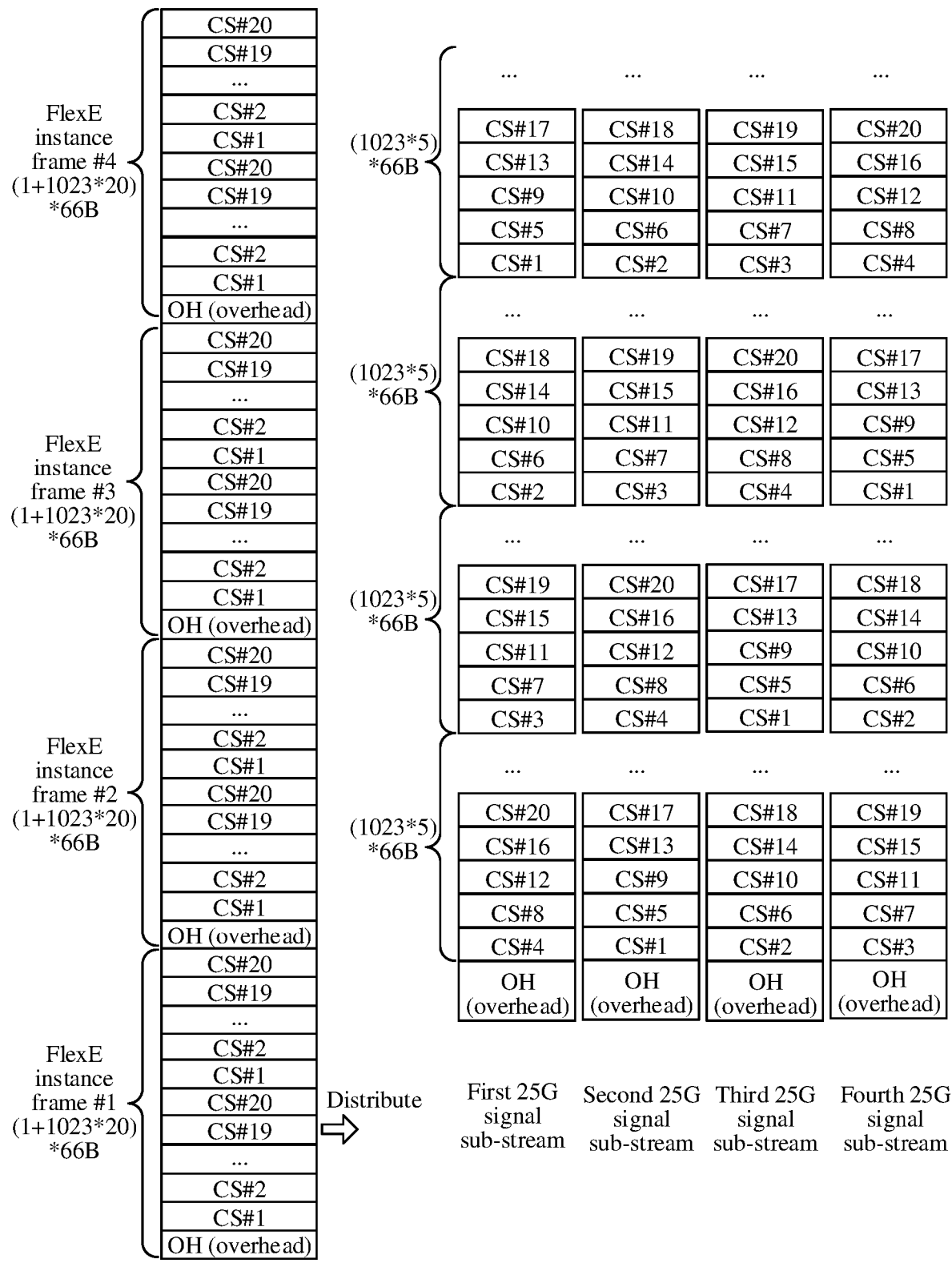
FIG. 12A is a schematic diagram of a first possible distribution manner according to Embodiment 2 of this application.

First possible distribution manner: The first FlexE signal stream uses four FlexE instance frames as a period, and is distributed, through polling, into four signal sub-streams by using one 66B code block as a granularity. For example, refer to FIG. 12A. In FIG. 12A, OH represents an overhead code block, and CS #1 to CS #20 represent a first to a twentieth payload code blocks.

After the distribution, each signal sub-stream maintains a periodic pattern:

A periodic pattern of a first 25 G signal sub-stream is: OH, 1023*(CS #4, CS #8, CS #12, CS #16, CS #20), 1023*(CS #3, CS #7, CS #11, CS #15, CS #19), 1023*(CS #2, CS #6, CS #10, CS #14, CS #18), 1023*(CS #1, CS #5, CS #9, CS #13, CS #17).

Aperiodic pattern of a second 25 G signal sub-stream is: 1023*(CS #1, CS #5, CS #9, CS #13, CS #17), OH, 1023*(CS #4, CS #8, CS #12, CS #16, CS #20), 1023*(CS #3, CS #7, CS #11, CS #15, CS #19), 1023*(CS #2, CS #6, CS #10, CS #14, CS #18).

A periodic pattern of a third 25 G signal sub-stream is: 1023*(CS #2, CS #6, CS #10, CS #14, CS #18), 1023*(CS #1, CS #5, CS #9, CS #13, CS #17), OH, 1023*(CS #4, CS #8, CS #12, CS #16, CS #20), 1023*(CS #3, CS #7, CS #11, CS #15, CS #19).

A periodic pattern of a fourth 25 G signal sub-stream is: 1023*(CS #3, CS #7, CS #11, CS #15, CS #19), 1023*(CS #2, CS #6, CS #10, CS #14, CS #18), 1023*(CS #1, CS #5, CS #9, CS #13, CS #17), OH, 1023*(CS #4, CS #8, CS #12, CS #16, CS #20).

Figures 1, 12B:
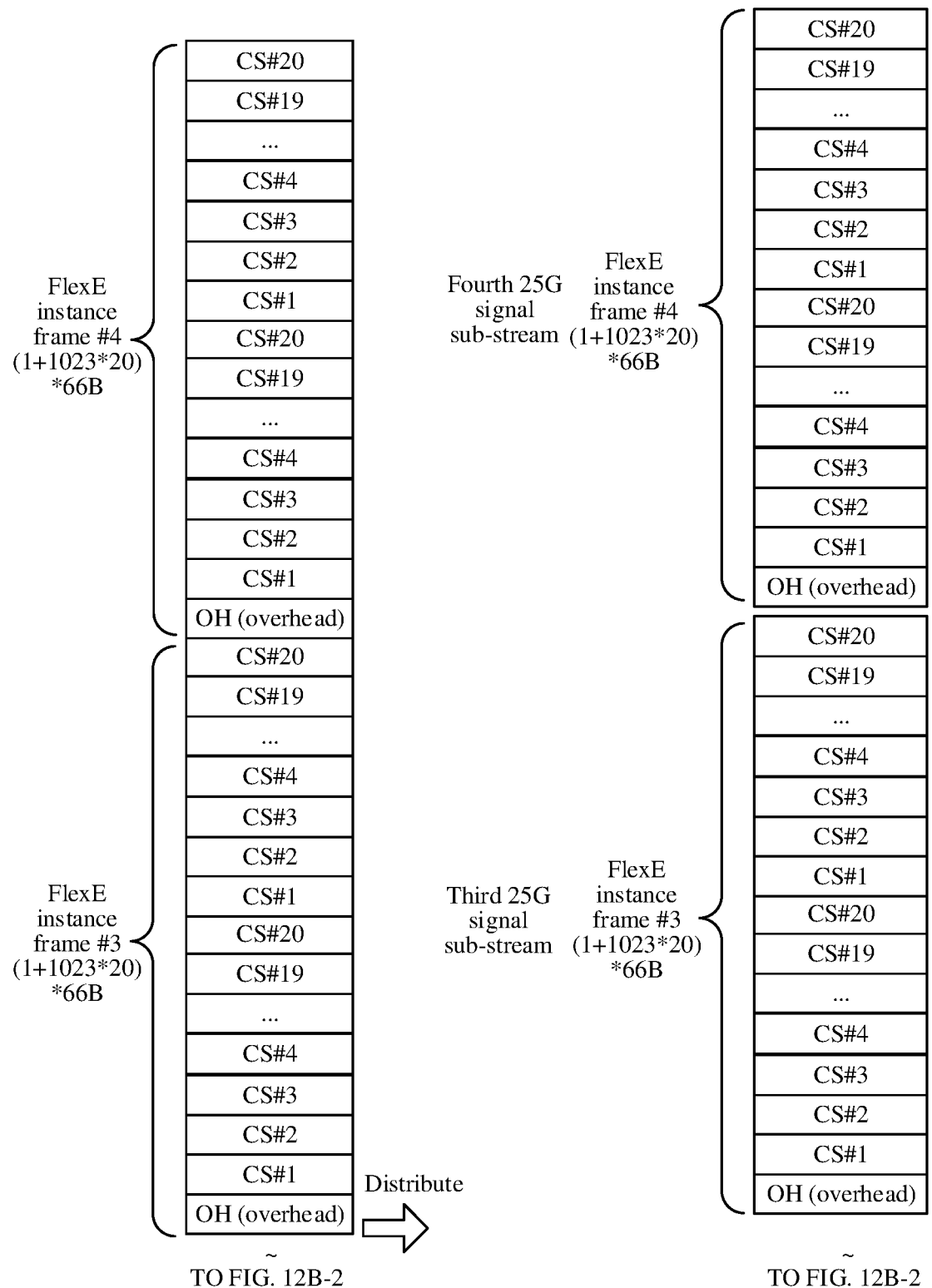
Figures 2, 12B:
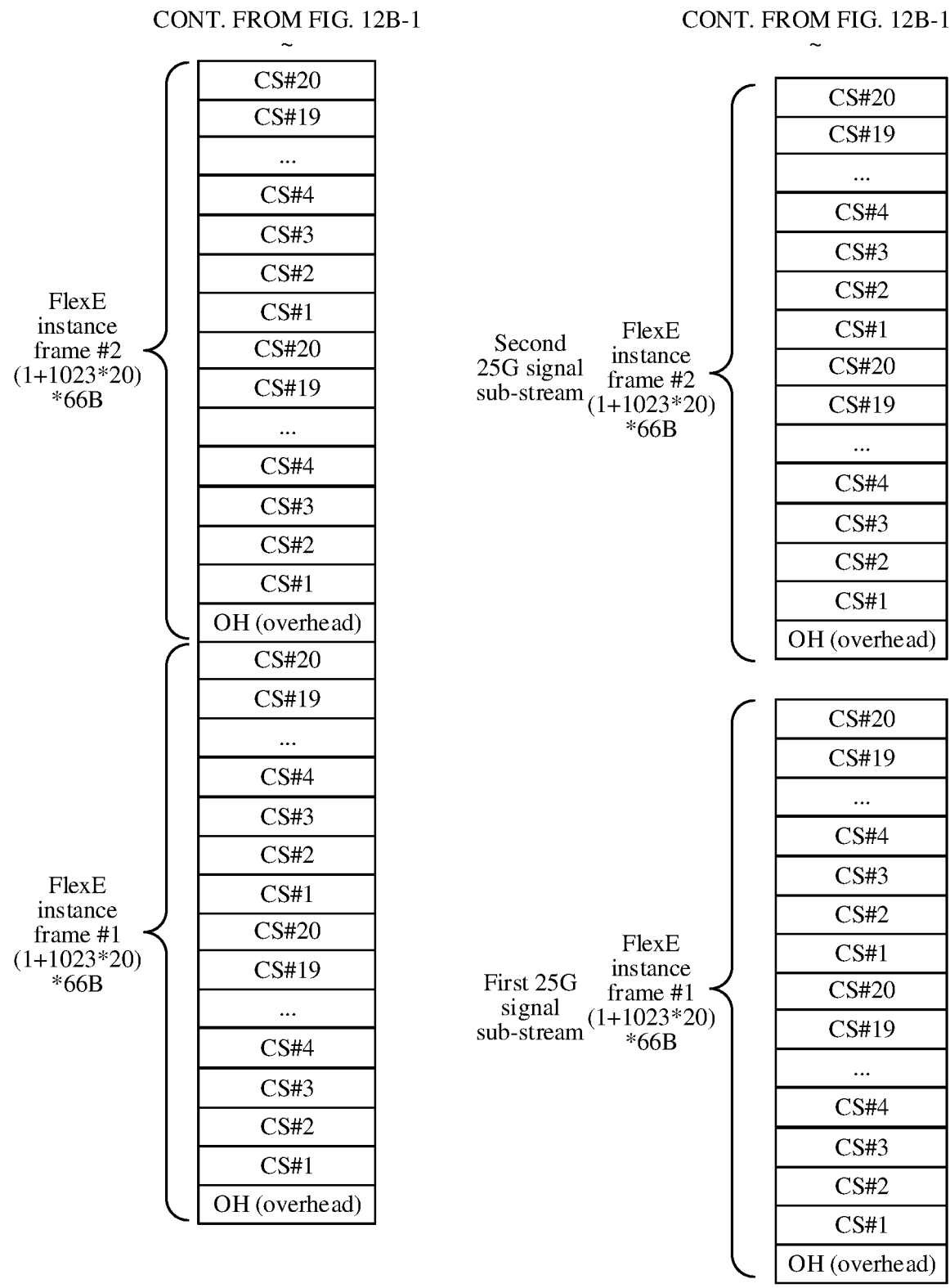

Second possible distribution manner: The first FlexE signal stream uses four FlexE instance frames as a period, and is distributed, through polling, into four signal sub-streams by using one FlexE instance frame as a granularity. For example, refer to FIG. 12B-1 and FIG. 12B-2.

Figures 1, 12C:
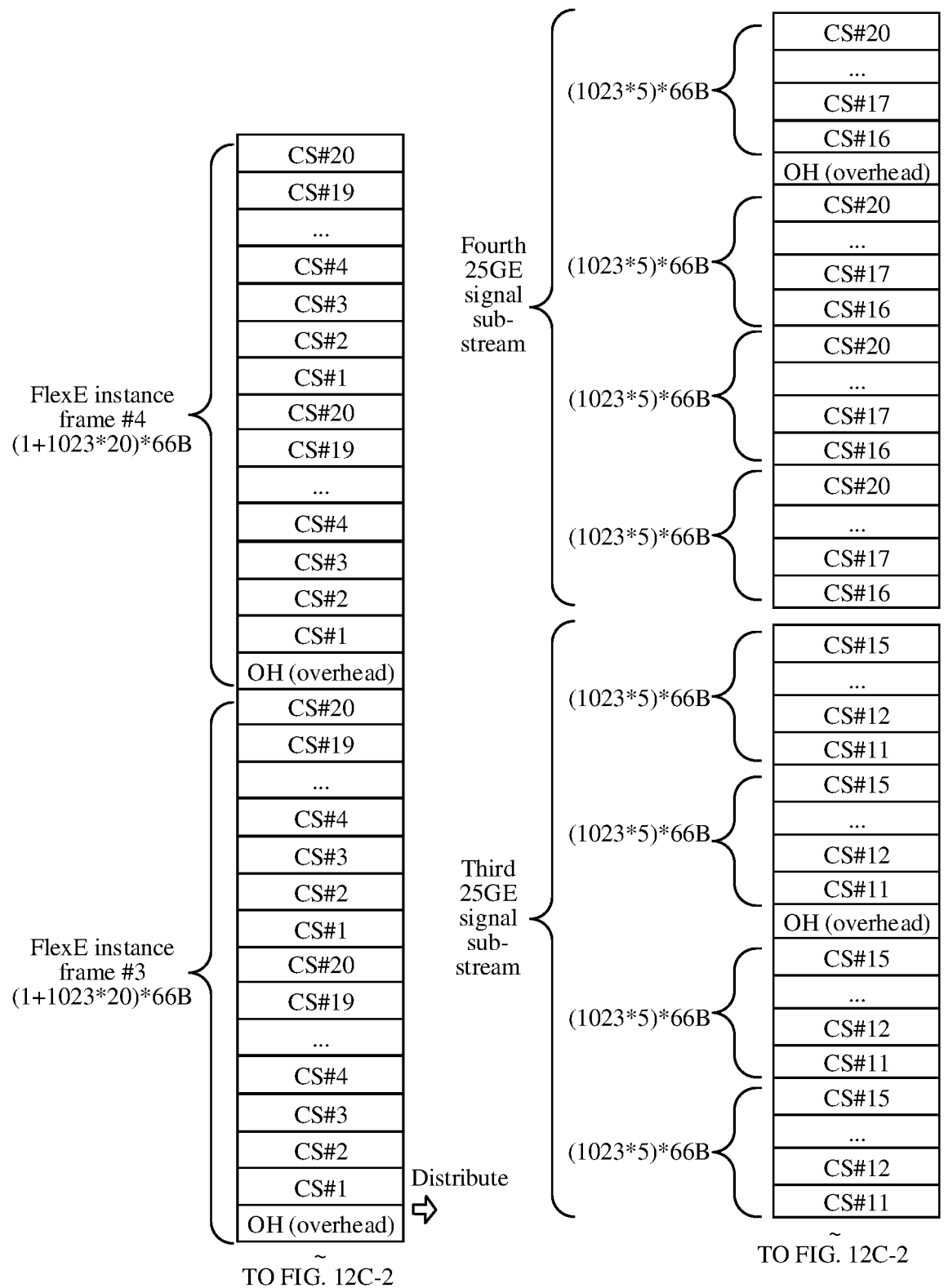
Figures 2, 12C:
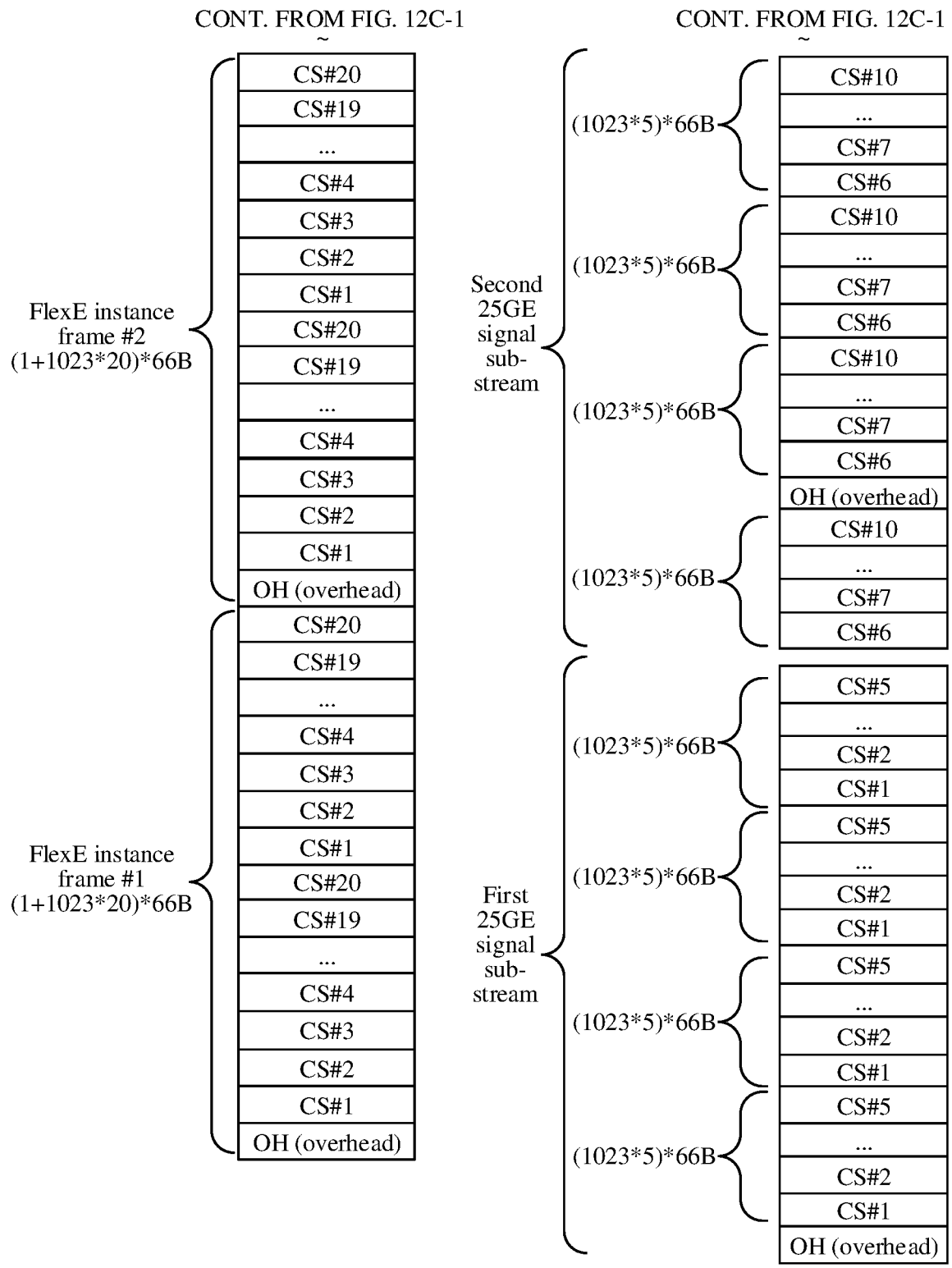

Third possible distribution manner: The first FlexE signal stream uses four FlexE instance frames as a period, and four overhead code blocks included in the four FlexE instance frames are distributed to four signal sub-streams. Payload code blocks included in each FlexE instance frame are distributed, through polling, to the four signal sub-streams by using a plurality of payload code blocks as a granularity. For example, referring to FIG. 12C-1 and FIG. 12C-2, the payload code blocks included in each FlexE instance frame are distributed, through polling, to four signal sub-streams by using five payload code blocks as a granularity.

After the distribution, each signal sub-stream maintains a periodic pattern:

A periodic pattern of the first 25 G signal sub-stream is: OH, 1023*(CS #1, CS #2, CS #3, CS #4, CS #5), 1023*(CS #1, CS #2, CS #3, CS #4, CS #5), 1023*(CS #1, CS #2, CS #3, CS #4, CS #5), 1023*(CS #1, CS #2, CS #3, CS #4, CS #5).

A periodic pattern of the second 25 G signal sub-stream is: 1023*(CS #6, CS #7, CS #8, CS #9, CS #10), OH, 1023*(CS #6, CS #7, CS #8, CS #9, CS #10), 1023*(CS #6, CS #7, CS #8, CS #9, CS #10), 1023*(CS #6, CS #7, CS #8, CS #9, CS #10).

A periodic pattern of the third 25 G signal sub-stream is: 1023*(CS #11, CS #12, CS #13, CS #14, CS #15), 1023*(CS #11, CS #12, CS #13, CS #14, CS #15), OH, 1023*(CS #11, CS #12, CS #13, CS #14, CS #15), 1023*(CS #11, CS #12, CS #13, CS #14, CS #15).

A periodic pattern of the fourth 25 G signal sub-stream is: 1023*(CS #16, CS #17, CS #18, CS #19, CS #20), 1023*(CS #16, CS #17, CS #18, CS #19, CS #20), 1023*(CS #16, CS #17, CS #18, CS #19, CS #20), OH, 1023*(CS #16, CS #17, CS #18, CS #19, CS #20).

Fourth possible distribution manner: The first FlexE signal stream uses more than four FlexE instance frames as a period. For example, the first FlexE signal stream can use eight FlexE instance frames as a period, and distribute eight overhead code blocks included in the eight FlexE instance frames to four signal sub-streams. Each signal sub-stream includes two overhead code blocks.

Optionally, each signal sub-stream includes distribution sequence information used to indicate a distribution sequence of the signal sub-stream in a FlexE signal stream to which the signal sub-stream belongs. For the descriptions of the distribution sequence information, refer to Embodiment 1.

When padding code blocks are inserted, for details, refer to step S603: after the first FlexE shim layer distributes the first FlexE signal stream into four signal sub-streams, because a corresponding transmission rate of the first 25 GE optical module at a physical coding sublayer is 25.78125 Gbit/s, considering a difference between inserting an AM by using a 100 GE optical module and no insertion of AM when using a 25 GE optical module, it is determined that a rate needing to be compensated is 16 k*25.78125 Gbit/s. Therefore, it is determined that one 66B padding code block PAD is inserted at an interval of 16 k code blocks, to obtain 4*n padded signal sub-streams, where k is 1024.

On the receiving end, the second n*100 G FlexE shim layer performs steps S605 to S607 shown in FIG. 6.

Embodiment 3 is used to resolve the foregoing problem 2. Description is made in detail by using an example in which n*100 G FlexE shim layers are interconnected with 4*A 25 GE optical modules, 2*B 50 GE optical modules, and C 100 GE optical modules. A+B+C=n, and each of A, B, and C is an integer greater than or equal to 0.

Figure 13A:
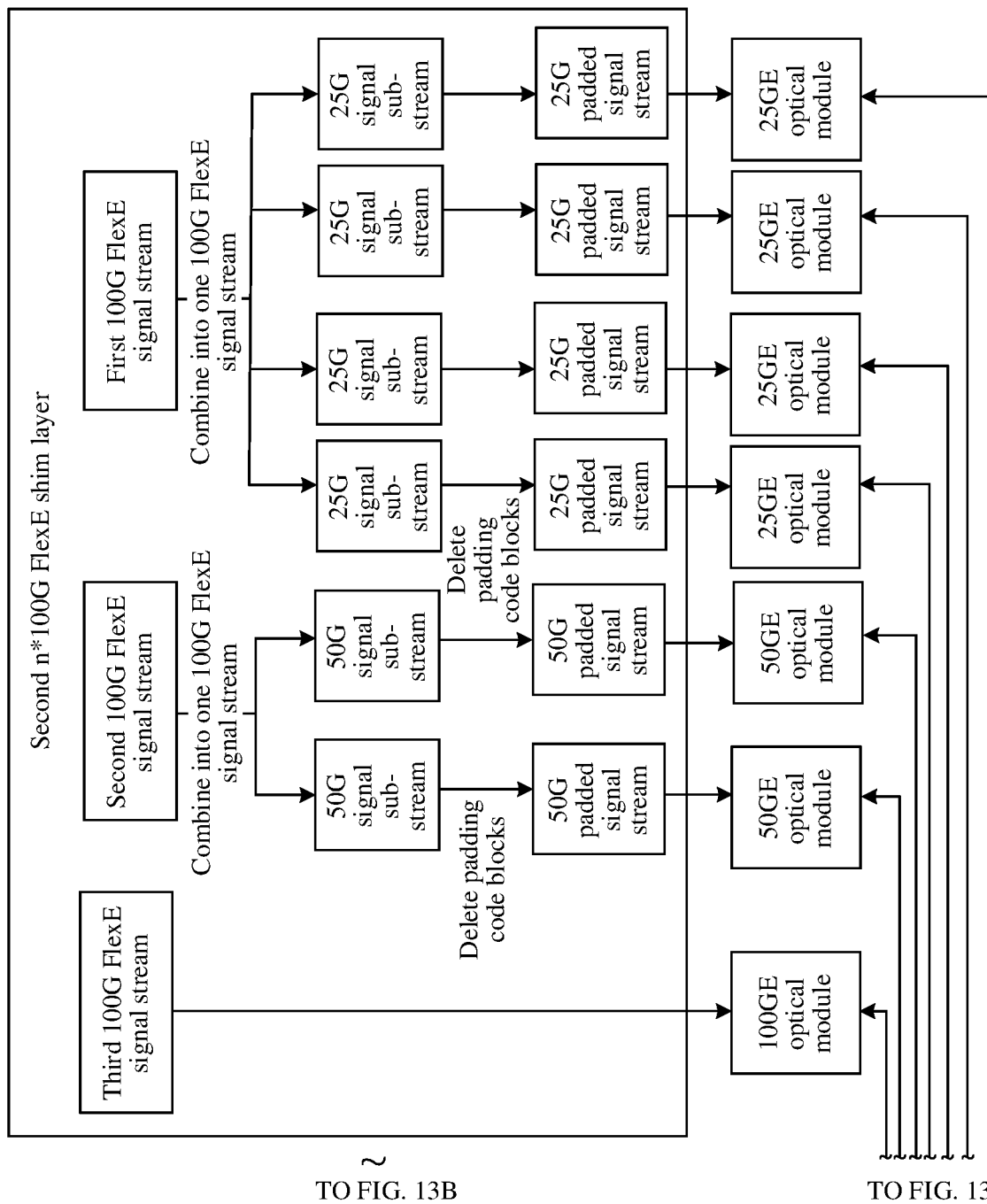
FIG. 13A and FIG. 13B are a schematic diagram of a scenario of optical modules with different transmission rates according to Embodiment 3 of this application.
Figure 13B:
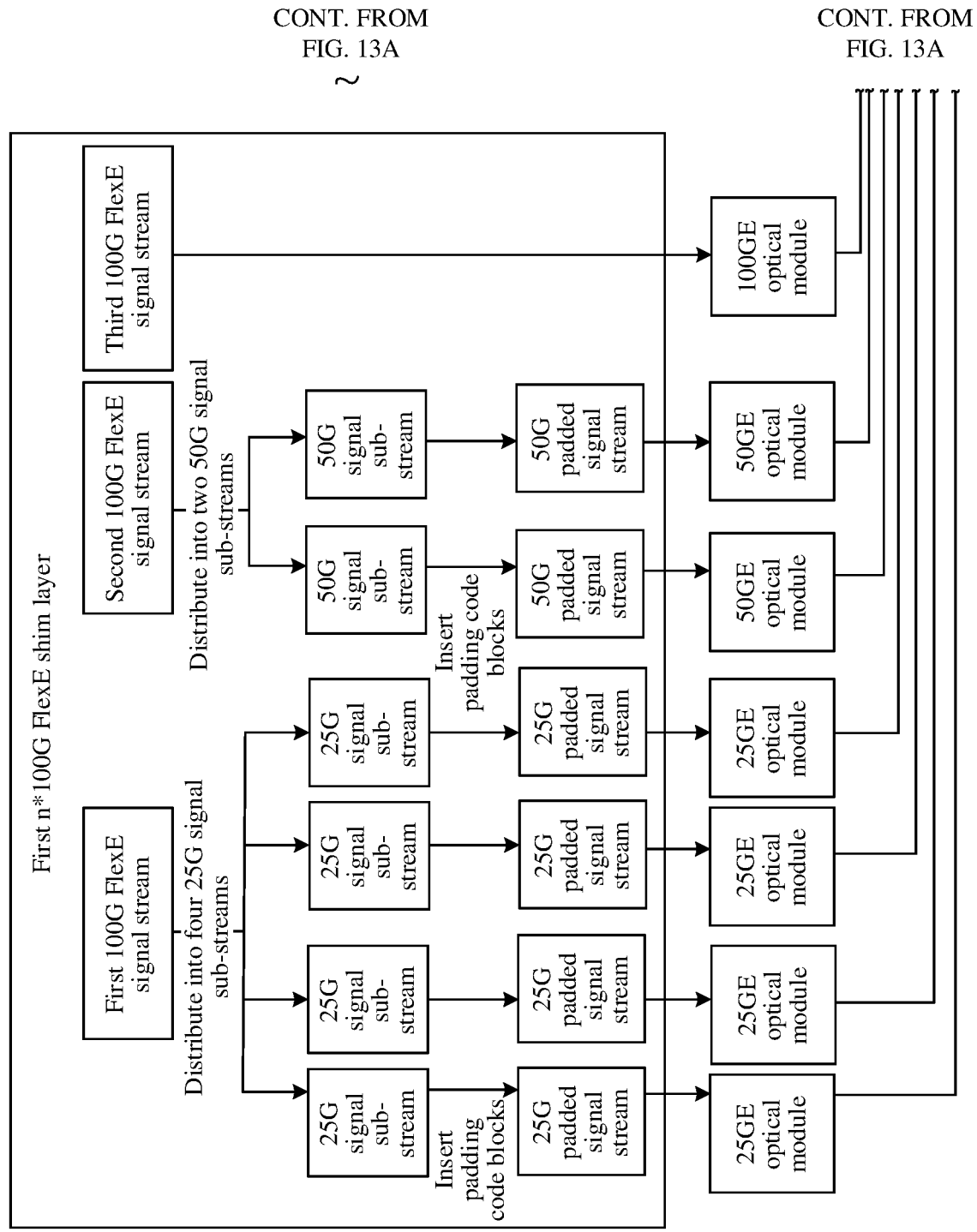

Referring to FIG. 13A and FIG. 13B, a first 3*100 G FlexE shim layer, four 25 GE optical modules, two 50 GE optical modules, and one 100 GE optical module are used on the transmitting end, and a second n*100 G FlexE shim layer, four 25 GE optical modules, two 50 GE optical modules, and one 100 GE optical module are used on the receiving end.

After obtaining three 100 G FlexE signal streams, the first FlexE shim layer distributes a first 100 G FlexE signal stream into four 25 G signal sub-streams. For a specific implementation process, refer to the implementation described in Embodiment 2. A second 100 G FlexE signal stream is distributed into two 50 G signal sub-streams. For a specific implementation process, refer to Embodiment 1. For a specific execution process of the second FlexE shim layer on the receiving end, refer to the manners described in the embodiments corresponding to FIG. 6 to FIG. 12C-1 and FIG. 12C-2.

In the foregoing solutions, a FlexE shim layer with a transmission rate of n*100 Gbit/s can be simultaneously compatible with optical modules with different transmission rates.

Embodiment 4 is used to resolve the foregoing problem 3: how to implement, when the transmission devices are interconnected by using the OTN and a transmission rate of an optical module included in a transmission device on an ingress side is different from a transmission rate of an optical module included in a transmission device on an egress side, compatibility between the transmission device on the ingress side and the transmission device on the egress side. A transmission device directly connected to the OTN is provided with a transmission function of an OTN device. Certainly, the transmission device directly connected to the OTN and a transmission device not directly connected to the OTN may be different types of transmission devices, or may be a same type of transmission devices. Subsequently, description is made by using an example in which the transmission device directly connected to the OTN is an OTN device, and the transmission device not directly connected to the OTN is a FlexE device.

In addition, it should be noted that, under an OTN architecture, the transmission device in this embodiment of this application may support a plurality of application modules. A first application module is a transmission device aware manner, signal streams sent by an n*100 G transmission device need to be parsed, and are carried and transported by using one or more flexible optical data units (ODUflex). A second application module is a transmission device unaware manner. The signal streams sent by the n*100 G transmission device are considered as n independent 100 G signal streams, and are carried and transported by using n optical data units 4 (ODU4).

Embodiment 4 is described in detail below with reference to the foregoing two application modules.

An example in which optical modules connected to a transmitting end and a receiving end on an ingress side of the OTN are 2*n 50 GE optical modules, and optical modules connected to a transmitting end and a receiving end on an egress side of the OTN are n 100 GE optical modules is used below.

Figure 14:
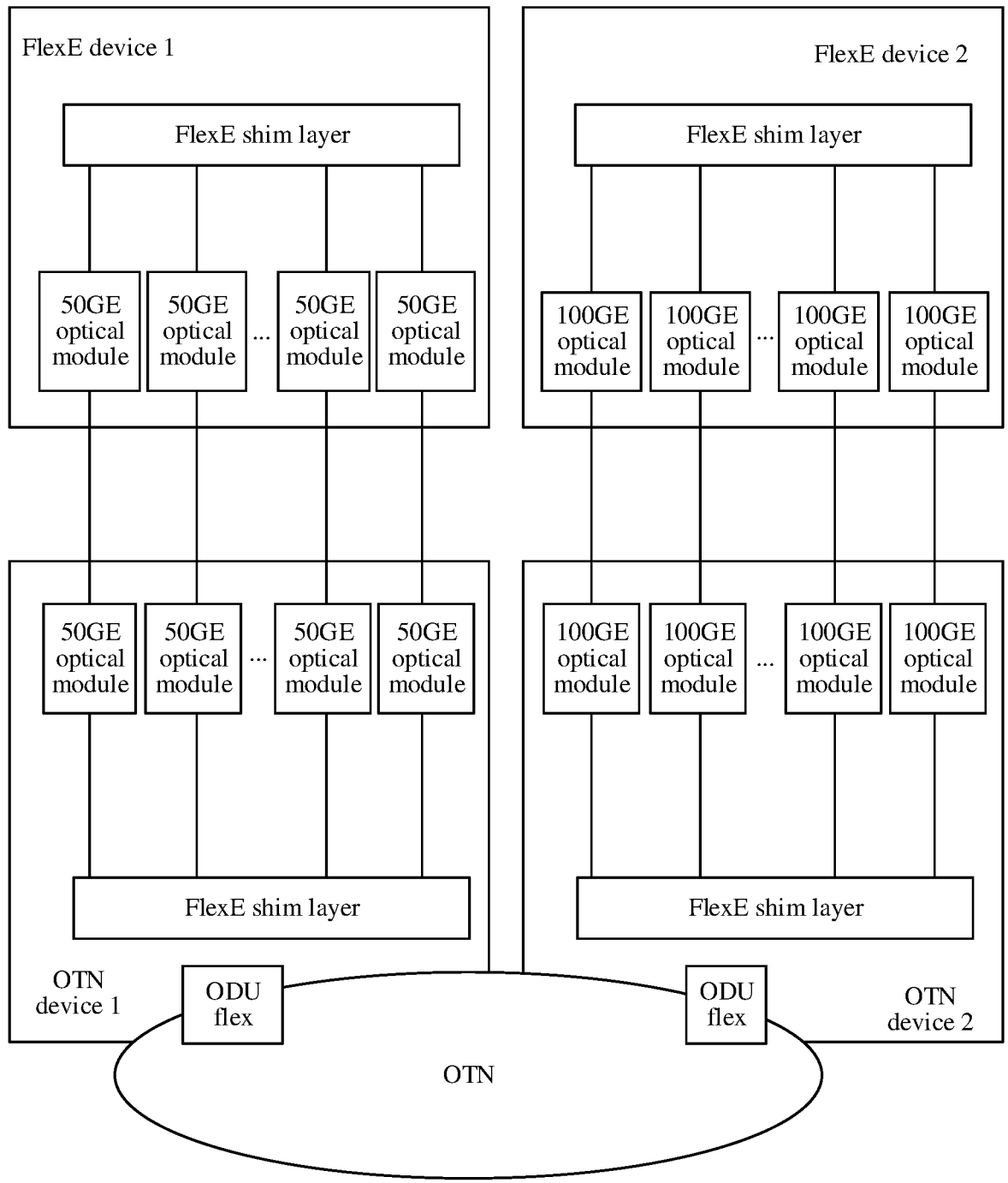
FIG. 14 is a schematic diagram of a scenario in which optical modules with different transmission rates are connected to two sides of an OTN according to Embodiment 4 of this application.

Referring to FIG. 14, on the ingress side of the OTN, the transmitting end is a FlexE device 1, and the receiving end is an OTN device 1. Each of the FlexE device 1 and the OTN device 1 includes an n*100 G FlexE shim layer and 2*n 50 GE optical modules. On the egress side of the OTN, the transmitting end is an OTN device 2, and the receiving end is a FlexE device 2. Each of the OTN device 2 and the FlexE device 2 includes an n*100 G FlexE shim layer and n 100 GE optical modules.

Figures 1, 15A:
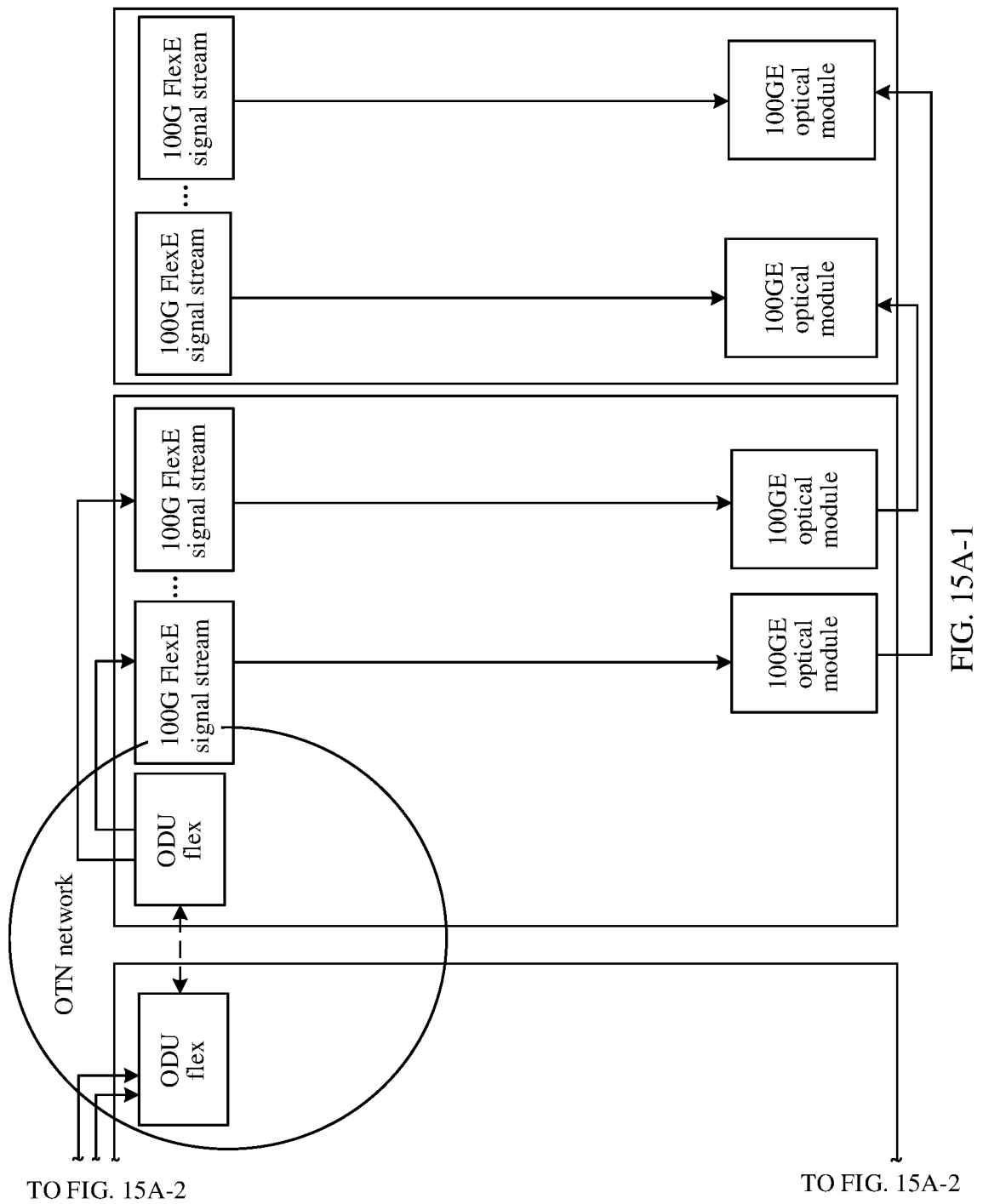
Figures 2, 15A:
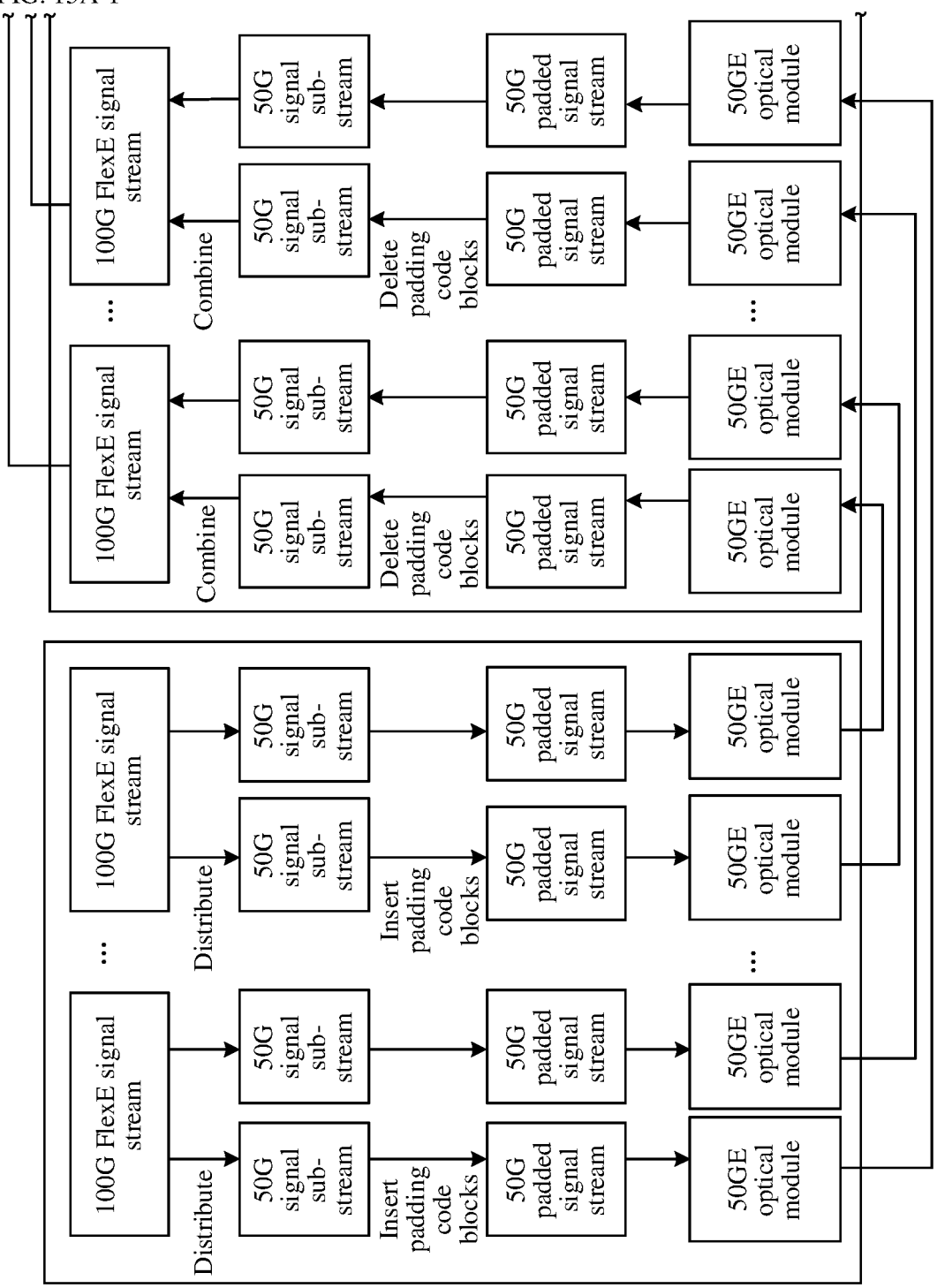

1). For the first application module, that is, the transmission device aware manner, refer to FIG. 15A-1 and FIG. 15A-2.

On the ingress side (e.g., a left side) of the OTN, the FlexE shim layer of the FlexE device 1 obtains FlexE signal streams; then, distributes the FlexE signal streams, distributes each 100 G FlexE signal stream into two 50 G signal sub-streams, and then inserts padding code blocks; and finally, sends the signal streams. For details, refer to the descriptions of the execution process of the first FlexE shim layer in Embodiment 1.

On the ingress side of the OTN, the OTN device 1 on the receiving end performs a processing process opposite to that performed by the FlexE device 1. For details, refer to the descriptions of the execution process for the second FlexE shim layer in Embodiment 1. After the OTN device 1 obtains n 100 G FlexE signal streams, the n 100 G FlexE signal streams are mapped to an ODUflex container, and are sent to the egress side of the OTN by using the OTN.

On the egress side (e.g., a right side) of the OTN, the OTN device 2 as the transmitting end demaps the ODUflex container of the OTN, obtains n 100 G FlexE signal streams, and sends the n 100 G FlexE signal streams to the FlexE device 2 as the receiving end by using n 100 G optical modules. The FlexE device 2 as the receiving end performs a processing process opposite to that performed by the OTN device 2. The processing thereof may completely conform to an n*100 G transmission device of an existing standard, and transmit related mapping and demapping through an OTN.

Figures 1, 15B:
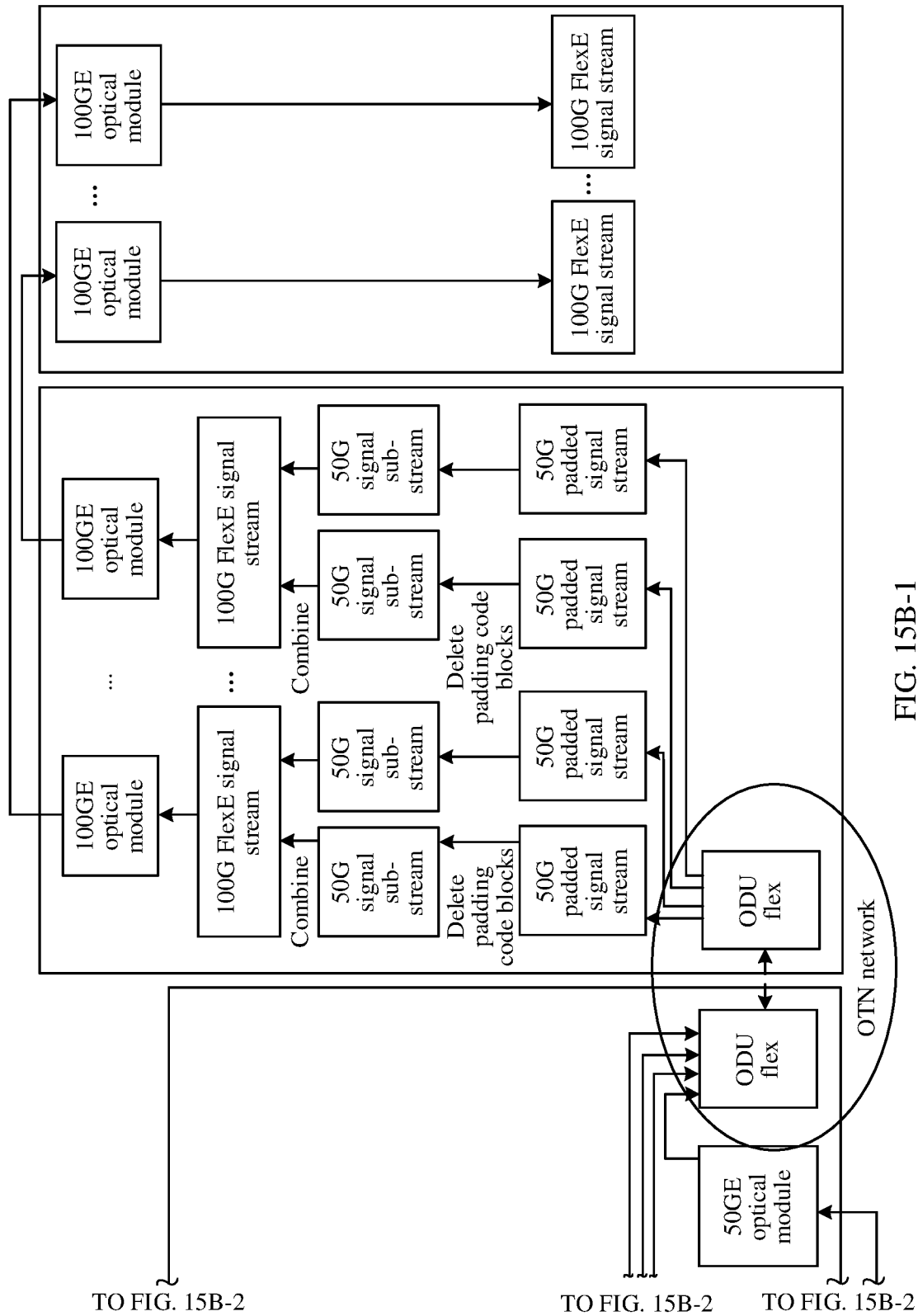
Figures 2, 15B:
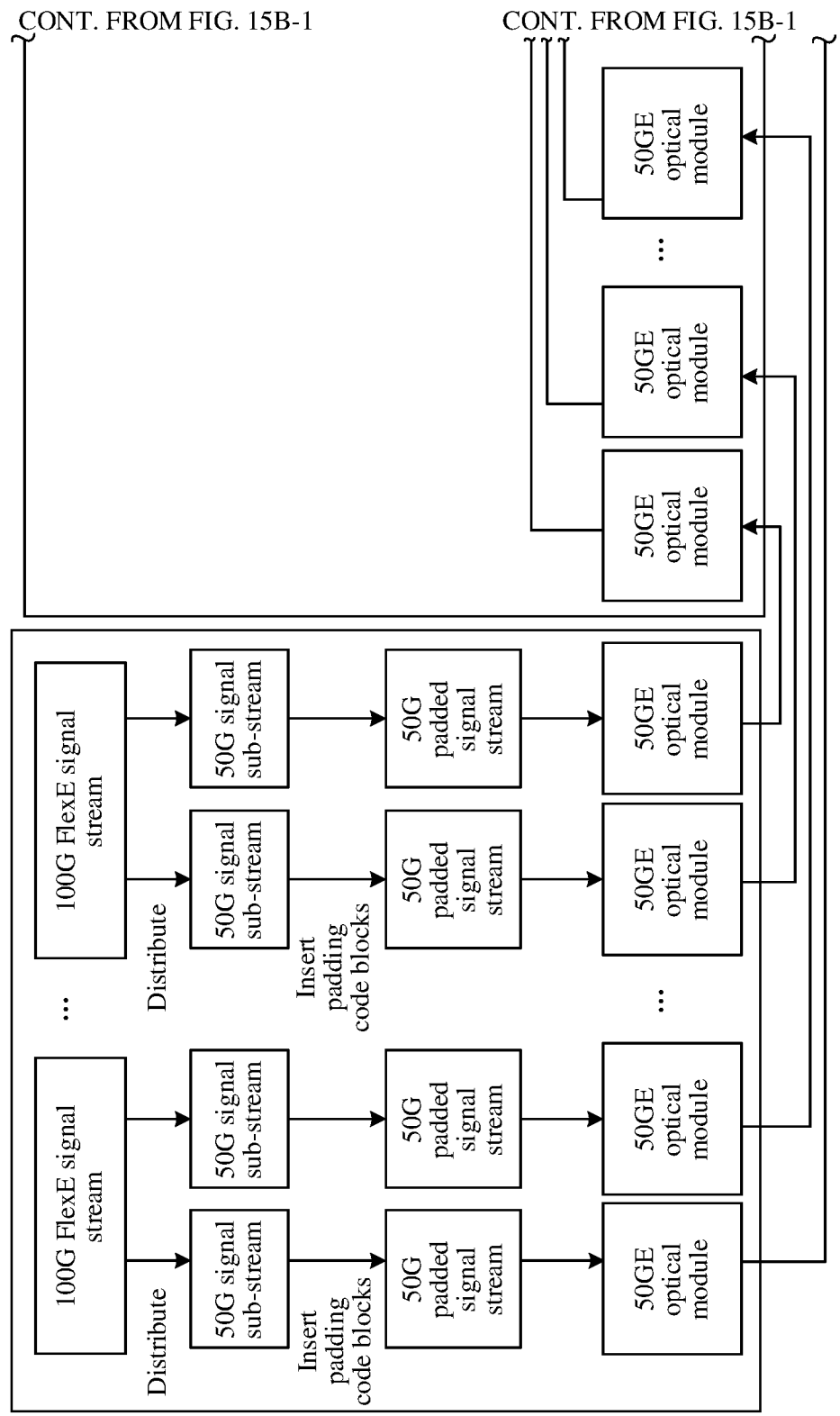

2). For the second application module, that is, the transmission device unaware manner, refer to FIG. 15B-1 and FIG. 15B-2.

On the ingress side (e.g., a left side) of the OTN, a FlexE shim layer of the FlexE device 1 obtains FlexE signal streams; then, distributes the FlexE signal streams; distributes each 100 G FlexE signal stream into two 50 G signal sub-streams, and then inserts padding code blocks; and finally, sends the signal streams. For details, refer to the descriptions of the execution process of the first FlexE shim layer in Embodiment 1.

On the ingress side of the OTN, the OTN device 1 on the receiving end processes only a 50 GE PHY layer part. After 50 GE padded signal sub-streams are received by using 2*n 50 GE optical modules, and 2*n 50 GE padded signal sub-streams are mapped to the OTN container ODUflex, and are sent to the egress side of the OTN by using the ingress side of the OTN.

On the egress side (e.g., a right side) of the OTN, the OTN device 2 as the transmitting end demaps the ODUflex container on the egress side of the OTN, to obtain 2*n padded 50 G signal sub-streams, then deletes the padding code blocks, and finally combines the signal streams. For details, refer to B1 to B3 in Embodiment 1, and n 100 G FlexE signal streams after the combination are sent to a FlexE device 4 as the receiving end by using n 100 G optical modules. The FlexE device 4 as the receiving end performs a processing process opposite to that performed by the OTN device 2. The processing thereof may completely conform to an n*100 G transmission device of an existing standard, and transmit related mapping and demapping through an OTN.

Figure 16:
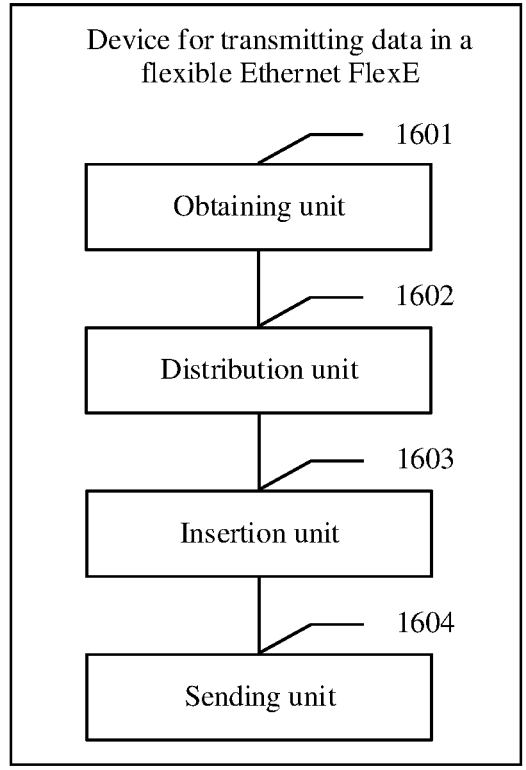
FIG. 16 is a schematic diagram of a device for transmitting data in a FlexE according to an embodiment of this application.

Based on an inventive concept the same as that of the foregoing embodiments, an embodiment of this application further provides a device for transmitting data in a FlexE. The device is configured to implement functions of a FlexE shim layer, and may be specifically a processor, a chip, a functional module, or the like in a transmission device on a transmitting end. As shown in FIG. 16, the device may include an obtaining unit 1601, a distribution unit 1602, an insertion unit 1603, and a sending unit 1604 that are configured to perform steps S601 to S604 respectively.

In this embodiment of this application, the unit division is an example, is merely logical function division, and may be other division during actual implementation. In addition, functional units in each embodiment of this application may be integrated into one processor or may exist alone physically. Alternatively, two or more units may be integrated into one unit. The integrated unit may be implemented in a form of hardware, or may be implemented in a form of a software functional unit.

Figure 17:
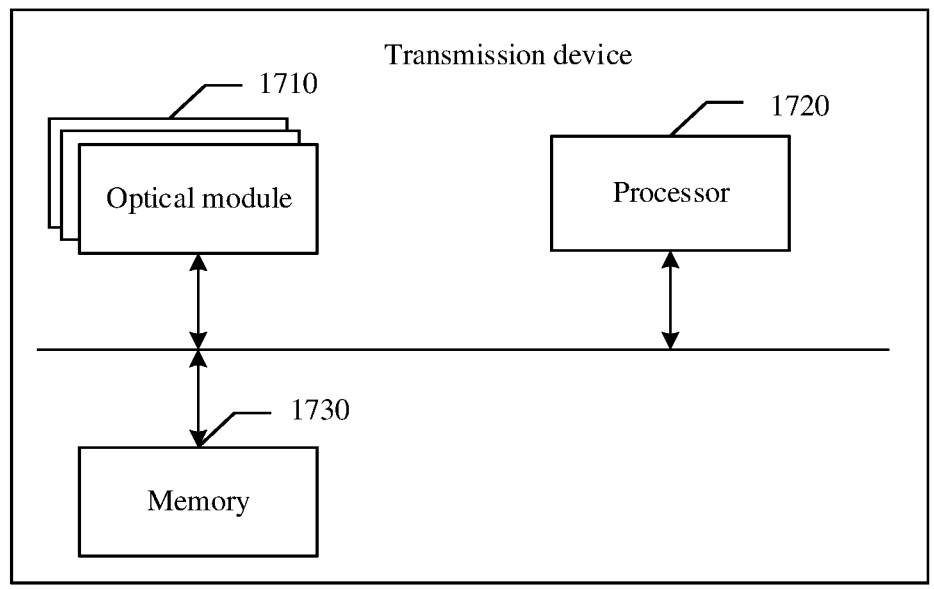
FIG. 17 is a schematic diagram of a transmission device according to an embodiment of this application.

As shown in FIG. 17, a transmission device on a transmitting end may include a plurality of optical modules 1710, a processor 1720, and a memory 1730. Each of the obtaining unit 1601, the distribution unit 1602, the insertion unit 1603, and the sending unit 1604 shown in FIG. 16 may be implemented by the processor 1720. The processor 1720 receives signal streams by using the plurality of optical modules 1710, and is configured to implement the method performed by the first FlexE shim layer in FIG. 6 to FIG. 15B-1 and FIG. 15B-2. During implementation, steps in a processing process may be completed by using an integrated logical circuit of hardware in the processor 1720 or an instruction in a form of software. The processor 1720 may be a general processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The universal processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1720 to implement the foregoing method may be stored in the memory 1730. The memory 1730 may be a nonvolatile memory such as a hard disk drive (HDD) or a solid-state drive (SSD), or may be a volatile memory such as a random-access memory (RAM). The memory 1730 is any other medium that can be used to carry or store expected program code in a form of an instruction or a data structure and that can be accessed by a computer, but is not limited thereto.

A specific connection medium between the foregoing plurality of optical modules 1710, the processor 1720, and the memory 1730 is not limited in this embodiment of this application.

Figure 18:
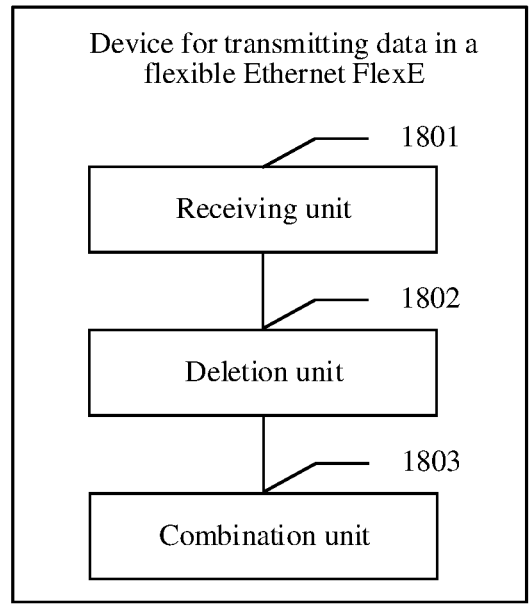
FIG. 18 is a schematic diagram of another device for transmitting data in a FlexE according to an embodiment of this application.

Based on an inventive concept the same as that of the foregoing embodiments, an embodiment of this application further provides a device for transmitting data in a FlexE. The device is configured to implement functions of a FlexE shim layer, and may be specifically a processor, a chip, a functional module, or the like in a transmission device on a receiving end. As shown in FIG. 18, the device may include a receiving unit 1801, a deletion unit 1802, and a combination unit 1803 that are configured to perform steps S605 to S607 respectively.

Figure 19:
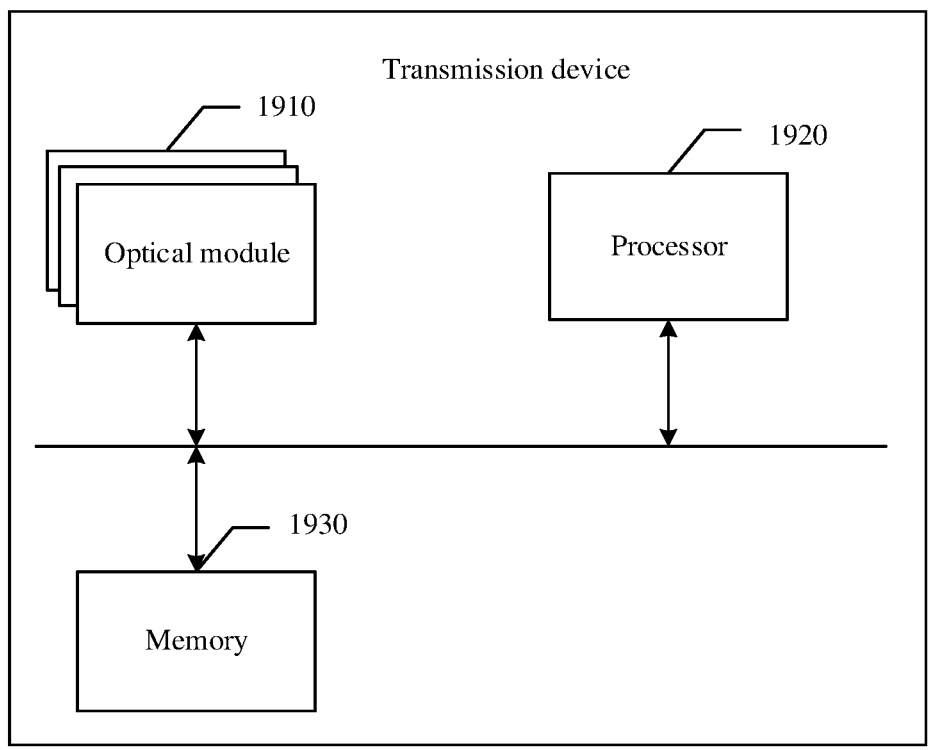
FIG. 19 is a schematic diagram of another transmission device according to an embodiment of this application.

As shown in FIG. 19, a transmission device on a receiving end may include a plurality of optical modules 1910, a processor 1920, and a memory 1930. Each of the receiving unit 1801, the deletion unit 1802, and the combination unit 1803 shown in FIG. 18 may be implemented by the processor 1920. The processor 1920 receives signal streams by using the plurality of optical modules 1910, and is configured to implement the method performed by the second FlexE shim layer in FIG. 6 to FIG. 15B-1 and FIG. 15B-2. During implementation, steps in a processing process may be completed by using an integrated logical circuit of hardware in the processor 1920 or an instruction in a form of software. The processor 1920 may be a general processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The universal processor may be a microprocessor or any conventional processor or the like. The steps of the method disclosed with reference to the embodiments of this application may be directly performed by a hardware processor, or may be performed by using a combination of hardware in the processor and a software unit. Program code executed by the processor 1920 to implement the foregoing method may be stored in the memory 1930. The memory 1930 may be a nonvolatile memory such as an HDD or an SSD, or may be a volatile memory such as a RAM. The memory 1930 is any other medium that can be used to carry or store expected program code in a form of an instruction or a data structure and that can be accessed by a computer, but is not limited thereto.

A specific connection medium between the foregoing plurality of optical modules 1910, the processor 1920, and the memory 1930 is not limited in this embodiment of this application.

Based on the foregoing embodiments, an embodiment of this application further provides a computer storage medium, where the storage medium stores a software program. When the software program is read and executed by one or more processors, the method provided in the foregoing embodiments may be implemented. The computer storage medium may include: various media that may store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement functions in the foregoing embodiments, for example, to obtain or process the signal streams in the foregoing method. Optionally, the chip further includes a memory. The memory is configured to store a program instruction and data that are necessary for the processor. The chip may include only a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for transmitting data in a flexible Ethernet (FlexE), comprising:
    obtaining n FlexE signal streams, wherein a transmission rate of each FlexE signal stream, from the n FlexE signal streams, is a first rate;
    distributing an $i^{th}$ FlexE signal stream into m signal sub-streams, wherein each signal sub-stream, of the m signal sub-streams, carries a first identifier, the first identifier is used to indicate that each signal sub-stream carrying the first identifier belongs to the $i^{th}$ FlexE signal stream, wherein i is a positive integer less than or equal to n, and m is an integer greater than or equal to 2;

inserting a preset quantity of padding code blocks into each signal sub-stream, of the m signal sub-streams, to obtain m padded signal sub-streams, so that a transmission rate of each of the m padded signal sub-streams is equal to a rate of a first optical module, wherein the rate of the first optical module is greater than the first rate/m, and the rate of the first optical module is less than the first rate; and sending the m padded signal sub-streams by using m first optical modules, wherein the padding code block carries a second identifier used to indicate a transmission rate of each signal sub-stream of the m signal sub-streams.

2. The method according to claim 1, further comprising: sending a $j^{th}$ FlexE signal stream by using a second optical module, wherein a rate of the second optical module is equal to the first rate, j is a positive integer less than or equal to n, and j is not equal to i.

3. The method according to claim 2, wherein each FlexE signal stream, of the n FlexE signal streams, comprises a plurality of FlexE instance frames, and each FlexE instance frame comprises one overhead code block; and each X consecutive FlexE instance frames in the $i^{th}$ FlexE signal stream are distributed to the m signal sub-streams, so that each signal sub-stream of the m signal sub-streams comprises at least one overhead code block in the X FlexE instance frames, wherein X is a positive integer greater than or equal to m.

4. The method according to claim 1, wherein each FlexE signal stream, of the n FlexE signal streams, comprises a plurality of FlexE instance frames, and each FlexE instance frame comprises one overhead code block; and each X consecutive FlexE instance frames in the ith FlexE signal stream are distributed to the m signal sub-streams, so that each signal sub-stream, of the m signal sub-streams, comprises at least one overhead code block in the X FlexE instance frames, wherein X is a positive integer greater than or equal to m.

5. The method according to claim 4, wherein each FlexE instance frame comprises W payload code blocks; and the X FlexE instance frames are distributed, through polling, to the m signal substreams by using Y payload code blocks as a granularity, wherein Y is a positive integer less than or equal to W/m.

6. The method according to claim 4, wherein the at least one overhead code block in each signal sub-stream, of the m signal sub-streams, carries distribution sequence information used to represent the signal sub-stream that carries the at least one overhead code block.

7. The method according to claim 4, wherein locations of overhead code blocks comprised in any two signal sub-streams of the m signal sub-streams are different.

8. The method according to claim 1, wherein each padding code block, of the padding code blocks, is inserted at an interval of 80 k code blocks.

9. The method according to claim 1, wherein each padding code block, of the padding code blocks, carries indication information used for indicating that each padding code block is different from an overhead code block and a payload code block.

10. The method according to claim 1, wherein the second identifier indicates that the transmission rate is any of 25 gigabits per second or 50 gigabits per second.

11. A method for transmitting data in a flexible Ethernet (FlexE), comprising:

receiving m padded signal sub-streams by using m first optical modules, wherein the m padded signal sub-streams comprise padding code blocks;

deleting the padding code blocks comprised in the m padded signal sub-streams, to obtain m signal sub-streams, wherein each signal sub-stream, of the m signal sub-streams, carries a first identifier, the first identifier is used to indicate that each signal sub-stream carrying the first identifier belongs to a first FlexE signal stream, and the padding code block carries a second identifier used to indicate a transmission rate of each signal sub-stream of the m signal sub-streams; and combining the m signal sub-streams into the first FlexE signal stream based on the first identifier carried in each signal sub-stream, of the m signal sub-streams, wherein a transmission rate of the first FlexE signal stream is a first rate, a rate of the first optical module is greater than the first rate/m, the rate of the first optical module is less than the first rate, and m is an integer greater than or equal to 2.

12. The method according to claim 11, wherein combining the m signal substreams into the first FlexE signal stream comprises:

identifying an overhead code block comprised in each signal sub-stream, of the m signal sub-streams, wherein the overhead code block carries distribution sequence information that represents a signal sub-stream that carries the overhead code block; and combining the m signal sub-streams into the first FlexE signal stream based on the distribution sequence information and the first identifier carried in each signal substream, of the m signal sub-streams.

13. The method according to claim 11, wherein the combining the m signal substreams into the first FlexE signal stream comprises:

identifying an overhead code block comprised in each signal sub-stream, of the m signal sub-streams, wherein locations of overhead code blocks comprised in any two signal sub-streams of the m signal sub-streams are different; and combining the m signal sub-streams into the first FlexE signal stream based on a location of the overhead code block comprised in each signal sub-stream, of the m signal sub-streams, and the first identifier carried in each signal sub-stream, of the m signal sub-streams.

14. A device for transmitting data in a flexible Ethernet (FlexE), comprising:

a processor; and m first optical modules, wherein a transmission rate of the processor is a first rate, a rate of a first optical module, from the m first optical modules, is greater than the first rate/m, and the rate of the first optical module is less than the first rate; and the processor is configured to:

obtain n FlexE signal streams, wherein a transmission rate of each FlexE signal stream, from the n FlexE signal streams, is the first rate;

distribute an ith FlexE signal stream into m signal sub-streams, wherein each signal sub-stream, of the m signal sub-streams, carries a first identifier, the first identifier is used to indicate that each signal sub-stream carrying the first identifier belongs to the ith FlexE signal stream, wherein i is a positive integer less than or equal to n, and m is an integer greater than or equal to 2;

insert a preset quantity of padding code blocks into each signal sub-stream, of the m signal sub-streams, to obtain m padded signal sub-streams, so that a transmission rate of each of the m padded signal sub-streams is equal to a rate of a first optical module, wherein the rate of the first optical module is greater than the first rate/m, and the rate of the first optical module is less than the first rate; and send the m padded signal sub-streams to the m first optical modules, wherein the m first optical modules are configured to send the m padded signal sub-streams, and the padding code block carries a second identifier used to indicate a transmission rate of each signal sub-stream of the m signal sub-streams.

15. The device according to claim 14, wherein the processor is further configured to:

send a $j^{th}$ FlexE signal stream to a second optical module, wherein a rate of the second optical module is equal to the first rate, j is a positive integer less than or equal to n, and j is not equal to i.

16. The device according to claim 14, wherein each FlexE signal stream comprises a plurality of FlexE instance frames, and each FlexE instance frame comprises one overhead code block; and each X consecutive FlexE instance frames in the $i^{th}$ FlexE signal stream are distributed to the m signal sub-streams, so that each signal sub-stream of the m signal sub-streams comprises at least one overhead code block in the X FlexE instance frames, wherein X is a positive integer greater than or equal to m.

* * * * *